US012041169B2

United States Patent
Jung et al.

(10) Patent No.: US 12,041,169 B2
(45) Date of Patent: Jul. 16, 2024

(54) ELECTRONIC DEVICE AND METHOD, PERFORMED BY ELECTRONIC DEVICE, OF TRANSMITTING CONTROL COMMAND TO TARGET DEVICE

(71) Applicant: SAMSUNG ELECTRONICS CO., LTD., Suwon-si (KR)

(72) Inventors: Sooyeon Jung, Suwon-si (KR); Oleksandr Andrieiev, Suwon-si (KR); Mingyu Lee, Suwon-si (KR); Kangjin Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/999,409

(22) Filed: Aug. 21, 2020

(65) Prior Publication Data

US 2021/0058252 A1 Feb. 25, 2021

Related U.S. Application Data

(60) Provisional application No. 62/890,711, filed on Aug. 23, 2019.

(51) Int. Cl.
*H04L 9/32* (2006.01)
*H04L 9/08* (2006.01)

(52) U.S. Cl.
CPC .......... *H04L 9/3213* (2013.01); *H04L 9/0822* (2013.01); *H04L 9/3263* (2013.01); *H04L 2209/84* (2013.01)

(58) Field of Classification Search
CPC ... H04L 9/3213; H04L 9/0822; H04L 9/3263; H04L 2209/84
See application file for complete search history.

(56) References Cited

U.S. PATENT DOCUMENTS

| 7,478,434 B1 | 1/2009 | Hinton et al. |
| 8,346,432 B2 * | 1/2013 | Van Wiemeersch .... H04L 12/66 701/36 |

(Continued)

FOREIGN PATENT DOCUMENTS

| KR | 20100012653 A | * | 2/2010 |
| KR | 20100012653 A | * | 2/2010 |

(Continued)

OTHER PUBLICATIONS

Dolev et al., Vehicle authentication via monolithically certified public key and attributes, 2016, Springer Science (Year: 2016).*

(Continued)

*Primary Examiner* — Yin Chen Shaw
*Assistant Examiner* — Alex D Carrasquillo
(74) *Attorney, Agent, or Firm* — Sughrue Mion, PLLC

(57) ABSTRACT

Provided is a method, performed by an electronic device, of safely and quickly transmitting a remote control command to a target device. The method includes: obtaining information related to encryption based on a mutual authentication process between the electronic device and the target device; providing, to a framework and from a digital key applet installed on a secure element of the electronic device, the information related to encryption; encrypting a remote control command by using the information related to encryption; and transmitting the encrypted remote control command to the target device.

18 Claims, 22 Drawing Sheets

(56) References Cited

U.S. PATENT DOCUMENTS

| | | | |
|---|---|---|---|
| 8,904,195 B1* | 12/2014 | Rahat | G06F 21/86 |
| | | | 713/194 |
| 9,780,954 B2* | 10/2017 | Bhattacharya | H04L 9/3273 |
| 10,057,259 B2* | 8/2018 | Murakami | G07C 9/00309 |
| 10,257,700 B2* | 4/2019 | Kang | H04L 63/0492 |
| 2013/0099892 A1* | 4/2013 | Tucker | H04L 9/08 |
| | | | 340/5.61 |
| 2014/0188348 A1* | 7/2014 | Gautama | G07C 9/00309 |
| | | | 701/48 |
| 2015/0213433 A1* | 7/2015 | Khan | G06Q 20/3829 |
| | | | 705/71 |
| 2015/0372811 A1* | 12/2015 | Le Saint | G06Q 20/3227 |
| | | | 705/76 |
| 2016/0358396 A1* | 12/2016 | Spiess | H04B 5/0056 |
| 2017/0164192 A1* | 6/2017 | Schussmann | H04W 12/041 |
| 2017/0236343 A1* | 8/2017 | Leboeuf | H04L 9/30 |
| | | | 340/5.61 |
| 2017/0347266 A1* | 11/2017 | Petel | B60R 25/241 |
| 2019/0141023 A1* | 5/2019 | Miramonti | H04L 63/08 |
| 2019/0359173 A1* | 11/2019 | Pudar | G07B 15/00 |
| 2020/0052905 A1* | 2/2020 | Mathias | H04L 9/3265 |
| 2020/0106774 A1* | 4/2020 | Lerch | H04L 9/3215 |
| 2020/0128401 A1* | 4/2020 | Shin | H04W 12/71 |

FOREIGN PATENT DOCUMENTS

| | | | | |
|---|---|---|---|---|
| KR | 1020170041443 A | 4/2017 | | |
| WO | 2019025749 A1 | 2/2019 | | |
| WO | WO-2019025749 A1 * | 2/2019 | | H04L 9/3247 |

OTHER PUBLICATIONS

Kim, et al.; ("An Efficient Authentication Scheme for Security and Privacy Preservation in V21 Communications"), IEEE, 2010, whole document (Year: 2010).*

Li, et al.; ("Lightweight Mutual Authentication for IoT and Its Applications"), IEEE, 2017 (Year: 2017).*

Kim et al.; An Efficient Authentication Scheme for Security and Privacy Preservation in V21 Communications, IEEE, 2017 (Year: 2017).*

International Search Report (PCT/ISA/210) dated Sep. 10, 2020 issued by the International Searching Authority in International Application No. PCT/KR2020/007600.

* cited by examiner

ELECTRONIC DEVICE AND METHOD, PERFORMED BY ELECTRONIC DEVICE, OF TRANSMITTING CONTROL COMMAND TO TARGET DEVICE

CROSS-REFERENCE TO RELATED APPLICATION(S)

This application is based on and claims the benefit of U.S. Provisional Patent Application No. 62/890,711, filed on Aug. 23, 2019, in the United States Patent and Trademark Office, the disclosure of which is incorporated by reference herein in its entirety.

BACKGROUND

1. Field

The disclosure relates to a method, performed by an electronic device, of transmitting a control command to a target device, and more particularly, to a method, performed by an electronic device, of safely transmitting a remote control command to a target device by using a digital key, and an electronic device performing the method.

2. Description of Related Art

With the supply of personalized electronic devices, such as smart phones and tablet personal computers (PCs), technologies for performing security, authentication, and the like using digital keys, i.e., digitized virtual keys, have been developed. As one method of such digital key technologies, a technology of integrating a digital key to a mobile device, for example, a smart phone, by using a wireless communication technology, such as near field communication (NFC), Bluetooth, or ultra-wide band (UWB), is being developed. By this method, the digital key may be inserted into the mobile device and a user of the mobile device may, instead of using a physical key, use the digital key to open or close a door, control another device, or perform media access.

As such, the use of digital keys can bring great improvements in user convenience and industrial effects. However, concerns regarding security have also been raised. In other words, because digital keys basically need to be combined to electronic devices, the digital keys may be exposed to malicious use such as hacking on the electronic devices. Accordingly, a technology for safely storing a digital key in an electronic device and accessing the digital key is required.

SUMMARY

Provided are an electronic device and a method by which the electronic device safely and quickly transmits a remote control command to a target device.

Additional aspects will be set forth in part in the description which follows and, in part, will be apparent from the description, or may be learned by practice of the presented embodiments.

In accordance with an aspect of the disclosure, a method, performed by an electronic device, of transmitting a control command to a target device includes: obtaining information related to encryption based on a mutual authentication process between the electronic device and the target device; providing, from a digital key applet installed on a secure element of the electronic device and to a framework, the information related to encryption; encrypting a remote control command by using the information related to encryption; and transmitting, to the target device, the encrypted remote control command.

The method may further include performing mutual authentication between the electronic device and the target device, wherein the performing the mutual authentication may include: receiving, from the target device, an ephemeral public key of the target device; transmitting an ephemeral public key of the electronic device to the target device; receiving, from the target device, first data in which information including the ephemeral public key of the target device and the ephemeral public key of the electronic device is signed with a secret key or private key of the target device; verifying the first data by using a public key of the target device; and transmitting, to the target device, second data in which the information including the ephemeral public key of the target device and the ephemeral public key of the electronic device is signed with a secret key or private key of the electronic device.

The obtaining the information related to encryption may include obtaining an encryption key by using the ephemeral public key of the target device and an ephemeral secret key of the electronic device.

The obtaining the information related to encryption may include: receiving a generation request for an encryption key from the target device; and obtaining the encryption key based on the generation request.

The obtaining the information related to encryption may include: identifying a parameter indicating that the mutual authentication process is initial mutual authentication, based on a command received from the target device during the mutual authentication process between the electronic device and the target device; and obtaining an encryption key based on the identified parameter.

The obtaining the information related to encryption may include: performing mutual authentication between the electronic device and the target device; and obtaining an encryption key from the target device by using a secure channel generated via the mutual authentication.

The transmitting the information related to encryption from the digital key applet to the framework may include transmitting the information related to encryption from the digital key applet to a trusted execution environment (TEE) in the framework, and the encrypting of the remote control command may include encrypting the remote control command by using the information related to encryption in the TEE.

The method may further include obtaining the remote control command generated by the framework or another application, based on a user input.

The method may further include receiving information related to a status of the target device from the target device that performed an operation corresponding to the encrypted remote control command.

The method may further include generating a symmetric long-term key based on a key exchange process between the electronic device and the target device, wherein the obtaining of the information related to encryption may include obtaining a nonce generated during the mutual authentication process, and the encrypting of the remote control command may include: obtaining an encryption key by using the nonce and the symmetric long-term key; and encrypting the remote control command by using the encryption key.

The obtaining the information related to encryption may include: performing mutual authentication between the electronic device and the target device; receiving a generation request for an encryption key from the target device; generating the encryption key by using an ephemeral public key of the target device received during the mutual authentication process, based on the generation request for the encryption key on the digital key applet; receiving, from the target device, a generation request for a session key including a nonce; and obtaining the session key by using the nonce and the encryption key, based on the generation request for the session key on the digital key applet, and the transmitting of the information related to encryption may include transmitting the session key from the digital key applet to the framework.

In accordance with another aspect of the disclosure, a method, performed by an electronic device, of transmitting a control command to a target device includes: obtaining a remote control command; transmitting the remote control command to the target device; and performing mutual authentication between the electronic device and the target device such that the target device verifies the remote control command, wherein the performing the mutual authentication includes: receiving, from the target device, a command requesting a signature of the electronic device regarding the remote control command; and transmitting, to the target device, a response including the signature of the electronic device regarding the remote control command.

In accordance with another aspect of the disclosure, an electronic device includes: a secure element in which a digital key applet managing a digital key is installed; a communicator configured to communicate with a target device; and at least one processor connected to the secure element and configured to execute program instructions stored in a memory to: obtain information related to encryption based on a mutual authentication process between the electronic device and the target device; to provide the information related to encryption from the digital key applet to a framework; encrypt a remote control command by using the information related to encryption; and transmit the encrypted remote control command to the target device via the communicator.

In accordance with another aspect of the disclosure, an electronic device includes: a secure element in which a digital key applet managing a digital key is installed; a communicator configured to communicate with a target device; and at least one processor connected to the secure element and configured to execute program instructions stored in a memory to: obtain a remote control command; transmit the remote control command to the target device; perform mutual authentication between the electronic device and the target device such that the target device verifies the remote control command; and to perform the mutual authentication, receive, from the target device, a command requesting a signature of the electronic device regarding the remote control command and transmitting, to the target device, a response including the signature of the electronic device regarding the remote control command.

In accordance with another aspect of the disclosure, a non-transitory computer-readable recording medium has recorded thereon program instructions executable by at least one processor of an electronic device to perform a method of transmitting a control command to a target device, the method including: obtaining information related to encryption based on a mutual authentication process between the electronic device and the target device; providing, from a digital key applet installed on a secure element of the electronic device and to a framework, the information related to encryption; encrypting a remote control command by using the information related to encryption; and transmitting the encrypted remote control command to the target device.

In accordance with another aspect of the disclosure, a non-transitory computer-readable recording medium has recorded thereon program instructions executable by at least one processor of an electronic device to perform a method of transmitting a control command to a target device, the method including: obtaining a remote control command; transmitting the remote control command to the target device; and performing mutual authentication between the electronic device and the target device such that the target device verifies the remote control command, wherein the performing the mutual authentication includes: receiving, from the target device, a command requesting a signature of the electronic device regarding the remote control command, and transmitting, to the target device, a response including the signature of the electronic device regarding the remote control command.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
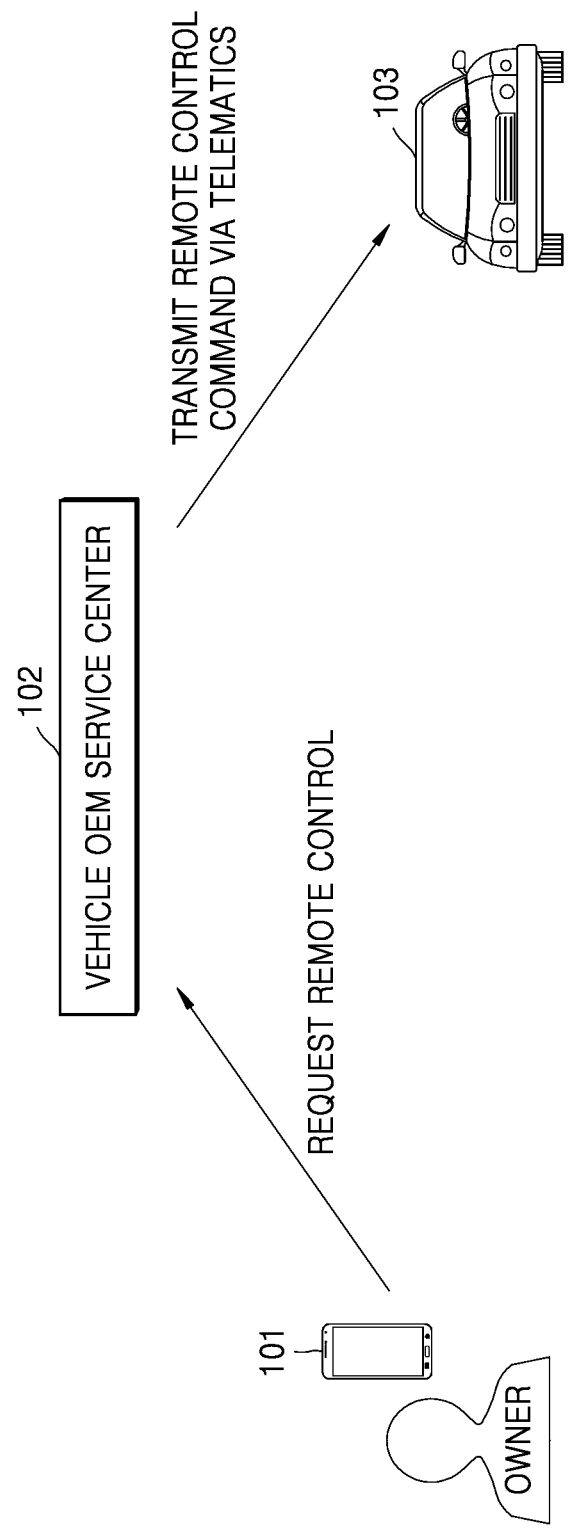
FIG. 1 is a diagram for describing a general method of remotely controlling a vehicle by using telematics.

Hereinafter, embodiments of the disclosure will be described in detail with reference to the accompanying drawings such that one of ordinary skill in the art may easily implement the present disclosure. However, the disclosure may be implemented in various different forms and is not limited to the embodiments of the disclosure described herein. Also, in the drawings, like reference numerals designate like elements throughout the specification.

Terms used in the disclosure are described as general terms currently used in consideration of functions described in the disclosure, but the terms may have different meanings according to an intention of one of ordinary skill in the art, precedent cases, or the appearance of new technologies. Thus, the terms used herein should not be interpreted only by its name, but based on the meaning of the terms together with the description throughout the specification.

While such terms as "first," "second," etc., may be used to describe various components, such components must not be limited to the above terms. The above terms are used only to distinguish one component from another.

Also, the terms used in the disclosure are only used to describe specific embodiments, and are not intended to limit the disclosure. An expression used in the singular encompasses the expression in the plural, unless it has a clearly different meaning in the context. Throughout the specification, when a part is "connected" to another part, the part may not only be "directly connected" to the other part, but may also be "electrically connected" to the other part with another element in between. In addition, when a part "includes" a certain component, the part may further include another component instead of excluding the other component, unless otherwise stated.

"The" and similar directives used throughout the present specification may indicate both singular and plural. Also, unless there is a clear description of an order of operations describing a method according to the disclosure, the operations described may be performed in a suitable order. The disclosure is not limited by the order of description of the described operations.

Throughout the disclosure, expressions such as "at least one of a, b [and/or] c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

In the present specification, a "digital key" denotes a digitized virtual key and a user may use the digital key to control or access a device. The disclosure relates to a method of managing the digital key, and hereinafter, the digital key may be referred to as a key, an encryption key, a session key, or the like.

The phrases "an embodiment of the disclosure," "an embodiment," or the like appearing in various places in this specification are not necessarily all referring to the same embodiment of the disclosure.

An embodiment of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented by algorithms executed in one or more processors. In addition, the disclosure may employ techniques according to the related art for electronic environment setting, signal processing, and/or data processing.

In addition, a connection line or a connection member between components shown in drawings is merely a functional connection and/or a physical or circuit connection. In an actual device, connections between components may be represented by various functional connections, physical connections, or circuit connections that are replaceable or added.

Various embodiments of the disclosure relate to a technology regarding medium access control (MAC) based on device-to-device (D2D) communication.

D2D communication denotes a method by which electronic devices geographically close to each other directly communicate with each other without going through an infrastructure such as a base station. The electronic devices may communicate in a one-to-one manner, a one-to-many manner, or a many-to-many manner. The D2D communication may use an unlicensed frequency band such as ultra-wide band (UWB), Wi-Fi direct, Bluetooth, or Bluetooth low energy (BLE). Alternatively, the D2D communication may increase a frequency utilization efficiency of a cellular system by using a licensed frequency band. The D2D communication may be limitedly used as a term referring to communication between things or machines. It is understood, however, that in the disclosure, the D2D communication may include any communication between not only simple electronic devices having a communication function, but also electronic devices of various types having a communication function, such as a smart phone or a personal computer.

Hereinafter, embodiments will be described in detail with reference to accompanying drawings.

Embodiments relates to a technology regarding a remote key operation using a digital key. The remote key operation denotes that a user remotely controls a target device by using an electronic device close to the user. For example, when the target device is a is a device for controlling a vehicle, the user may transmit a remote control command to the target device via the electronic device to remotely open a door of the vehicle, activate an air conditioner of the vehicle, preheat an engine of the vehicle, or park the vehicle.

Here, the electronic device may safely transmit the remote control command to the target device by using a digital key stored in a secure element. Hereinafter, a general method that may be used by the electronic device to transmit the remote control command to the target device is described with reference to FIGS. 1 and 2.

FIG. 1 is a diagram for describing a general method of remotely controlling a vehicle 103 by using telematics.

An owner of the vehicle 103 may use the telematics to remotely control the vehicle 103 by using an electronic device 101. The owner of the vehicle 103 may request a service center 102 of an original equipment manufacturer (OEM), for example, a vehicle manufacturer, for a remote control via the electronic device 101. The electronic device 101 may request the service center 102 for a remote control, based on a user input of the owner received via an application, or based on a phone call to the service center 102. Upon being requested for the remote control from the owner, the service center 102 may transmit a remote control command to the vehicle 103 via the telematics.

The general method described with reference to FIG. 1 has a wide service coverage. For example, by using the telematics, the owner at an office may control the vehicle 103 at home. However, such a general method may have latency. Thus, it is unlikely that the general method of remotely controlling the vehicle 103 by using telematics may be used for an operation where a risk of an accident is high due to latency, such as remote parking. Accordingly, a method, performed by an electronic device, of transmitting a remote control command to a vehicle by using Bluetooth low energy (BLE) communication described below may also be considered.

Figure 2:
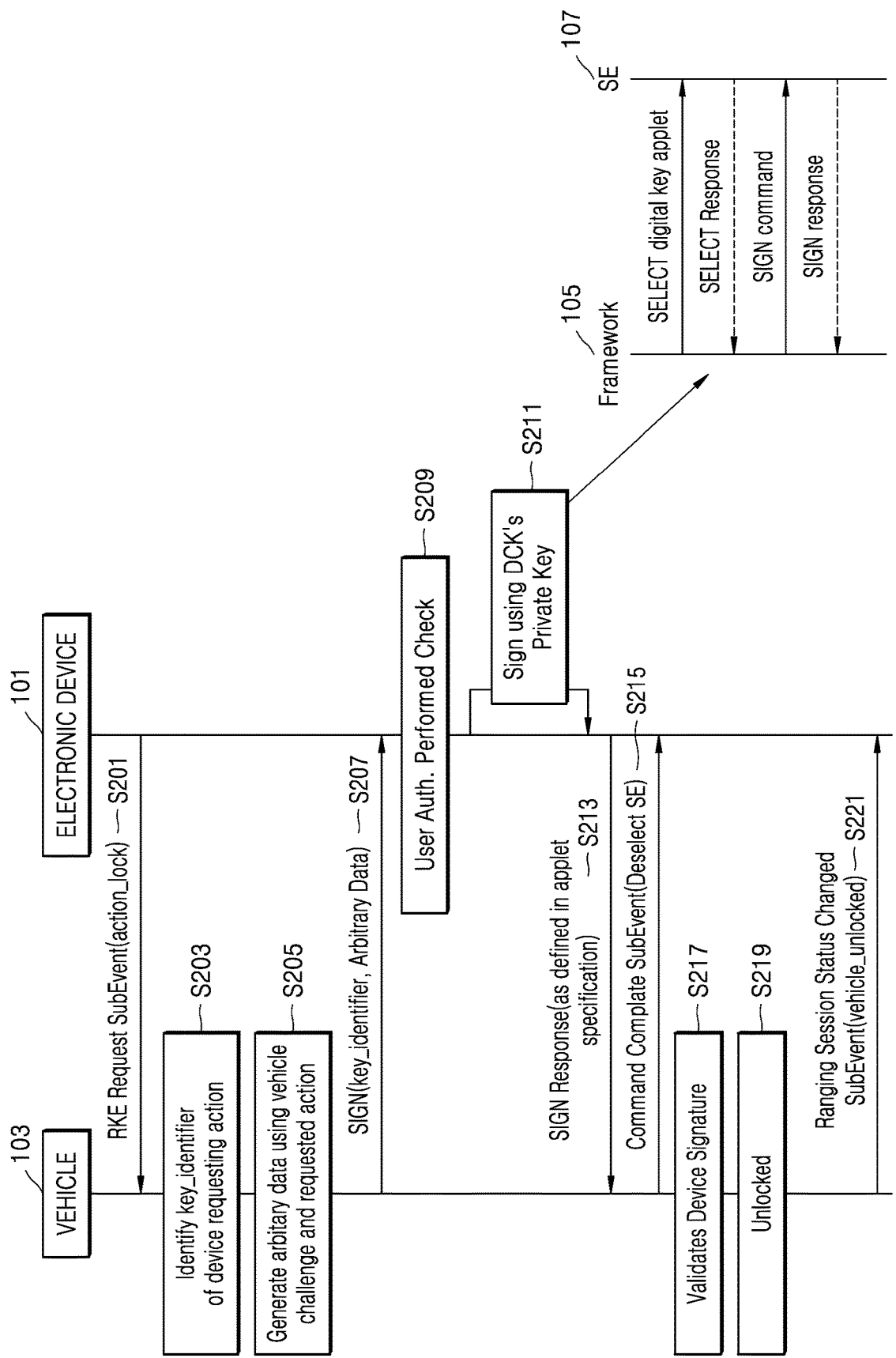
FIG. 2 is a flowchart of a general method, performed by an electronic device, of transmitting a remote control command to a vehicle by using Bluetooth low energy (BLE) communication.

FIG. 2 is a flowchart of a general method, performed by the electronic device 101, of transmitting a remote control command to the vehicle 103 by using BLE communication.

In FIG. 2, the electronic device 101 and the vehicle 103 may communicate with each other by using a BLE communication method. In operation S201, the electronic device 101 may transmit a remote control service request message, for example, a remote key entry (RKE) request message, to the vehicle 103, together with a digital key for the vehicle 103. For example, the electronic device 101 may transmit a message requesting a remote control service enabling a user to remotely open a door of the vehicle 103.

In operation S203, the vehicle 103 may identify a key identifier included in the remote control service request message. In operation S205, the vehicle 103 may generate arbitrary data by using a vehicle challenge and an operation requested of the vehicle 103. In operation S207, the vehicle 103 may transmit, to the electronic device 101, a signature request regarding information including the key identifier and the arbitrary data. In operation S209, the electronic device 101 may check whether there was a user approval on a remote control service request.

In operation S211, the electronic device 101 may sign information received from the vehicle 103, by using a secrete key (SK) or a private key of the electronic device 101. In operation S211, a framework 105 of the electronic device 101 may select a digital key applet corresponding to the vehicle 103 from a secure element 107 and transmit the signature request to the secure element 107.

In operation S213, the electronic device 101 may transmit the signed information to the vehicle 103 from the secure element 107. In operation S215, the vehicle 103 may transmit, to the electronic device 101, a response that the signed information is received.

The vehicle 103 may validate the signature of the electronic device 101 in operation S217 and change a state to an unlocked state in operation S219. In operation S221, the vehicle 103 may transmit, to the electronic device 101, a result that a ranging session state is changed to 'vehicle_unlocked.'

The general method described with reference to FIG. 2 may have latency as in the telematics. This is because, as shown in FIG. 2, the electronic device 101 accesses the secure element 107 and signs by using a digital key stored in the secure element 107 whenever a remote control command is transmitted to the vehicle 103. In other words, the electronic device 101 repeats operation S211 of FIG. 2 whenever the remote control command is transmitted, so as to prevent a replay attack by another device. Accordingly, it is unlikely that the general method of FIG. 2 may be used for an operation where a risk of an accident is high due to latency, such as remote parking.

To prevent the latency in the general methods of FIGS. 1 and 2, various embodiments provide a method of continuously and quickly transmitting a remote control command. Hereinafter, various embodiments for safely and quickly transmitting a remote control command are described in detail below with reference to FIGS. 3, 4A, 4B, and 5 through 21.

Figure 3:
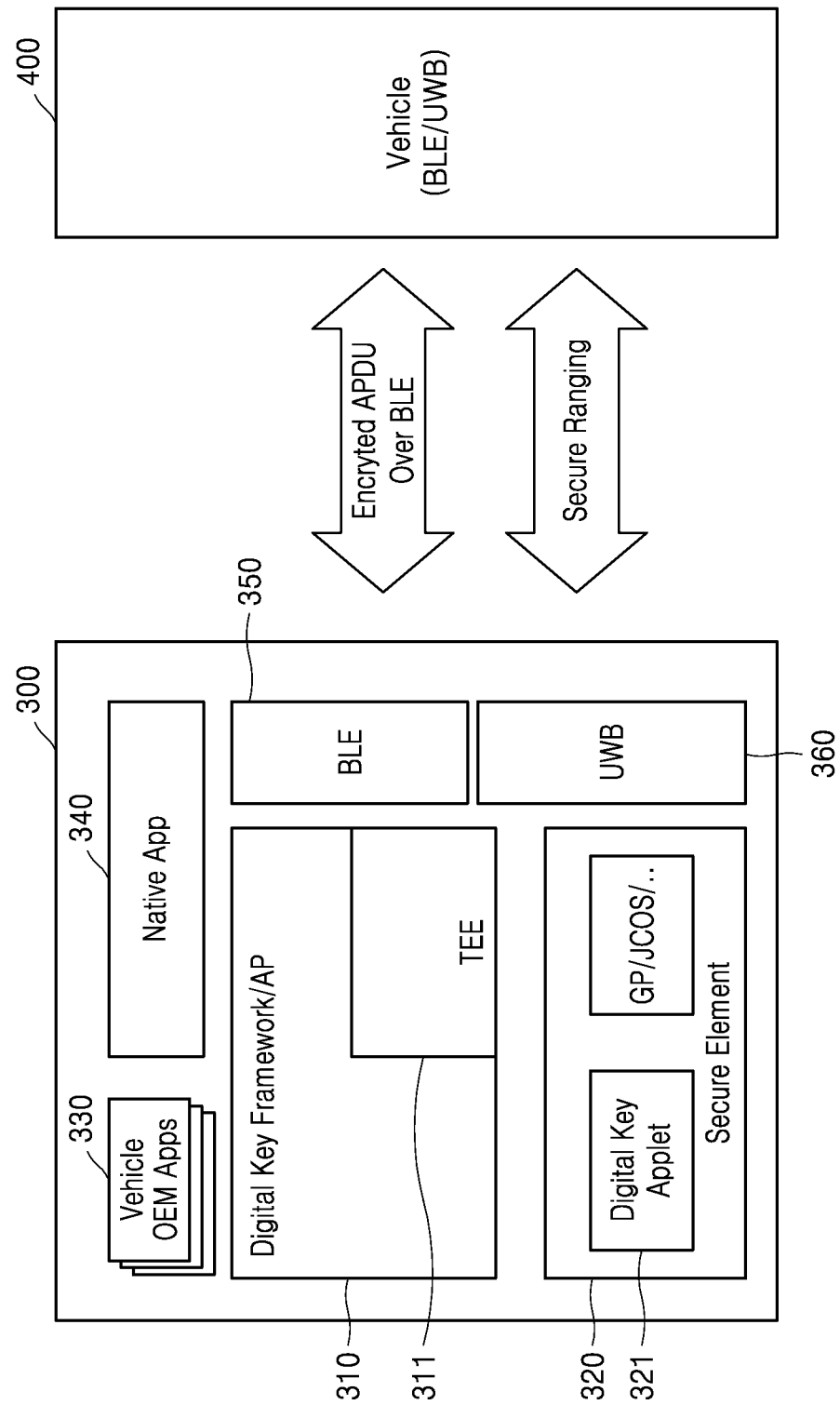
FIG. 3 is a diagram of a configuration of a vehicle remote control system, according to an embodiment.

FIG. 3 is a diagram of a configuration of a vehicle remote control system, according to an embodiment.

As shown in FIG. 3, an electronic device 300 and a vehicle 400 included in the vehicle remote control system according to an embodiment may provide a remote key service by including a UWB module and a BLE module. The vehicle 400 according to an embodiment may denote a vehicle including an electronic control device, but is not limited thereto. The vehicle 400 may denote a separate electronic device distinguished from a vehicle. For example, the vehicle 400 may denote an electronic device mounted on, connected to, included in, or controlling a vehicle. In this case, the vehicle 400 may denote a vehicle console, a vehicle key system, a terminal mounted on a vehicle, a vehicle telematics system, a vehicle electric device system, etc. Hereinafter, for convenience of description, all the above examples will be simply referred to as the vehicle 400.

The remote key service may safely transmit, to the vehicle 400, a remote key command input by a user through the electronic device 300 via a BLE connection between the electronic device 300 and the vehicle 400. For example, the remote key command input by the user may include remotely opening a door of the vehicle 400, remotely starting the vehicle 400, or remotely parking the vehicle 400. The vehicle remote control system according to an embodiment may include the electronic device 300 and the vehicle 400. The electronic device 300 and the vehicle 400 may communicate with each other by using BLE and/or UWB.

The electronic device 300 according to an embodiment may be embodied in various forms. For example, the electronic device 300 may include a smart television (TV), a set-top box, a mobile phone, a tablet personal computer (PC), a digital camera, a laptop computer, a desktop computer, an electronic book terminal, a digital broadcasting terminal, a personal digital assistant (PDA), a portable multimedia player (PMP), a navigation device, an MP3 player, a wearable device, etc.

Referring to FIG. 3, the electronic device 300 may be provided with a vehicle OEM application 330 provided by a vehicle manufacturer, a native application 340, and a framework 310, and may include a secure element 320, a BLE communication module 350, and a UWB communication module 360. However, a configuration of the electronic device 300 is not limited to that shown in FIG. 3, and the electronic device 300 may include more, fewer, and/or different components than those shown in FIG. 3.

The framework 310 may indicate a software and/or hardware environment that provides a function where a mobile application is capable of operating in a form of an application programming interface (API). The framework 310 may provide a digital key service as an entity present in a region other than a secure entity.

For example, the framework 310 may be included in an operating system or may be implemented as software separate from the operating system. The framework 310 may provide the digital key service. The framework 310 may provide an API accessible by an external entity (for example, a provision server, an OEM backend server, or a service provider server), and may provide a function such as an access control and command conversion for an access to the secure element 320.

The secure element 320 according to an embodiment is an independent secure storage device of the electronic device 300, and is a secure region to which only an authenticated application is accessible. For example, the secure element 320 may include an embedded secure element (eSE), a secure digital (SD) card, a strong box, a security unity, a universal integrated circuit card (UICC), or an embedded UICC (eUICC).

The electronic device 300 may exchange an encrypted application protocol data unit (APDU) with the vehicle 400 by using the BLE communication module 350. Also, the electronic device 300 may perform secure ranging with a target device by using the UWB communication module 360. Here, a digital key may be used for transmission and reception of encrypted data and for secure ranging.

An applet (or a code or application) for digital key management may be installed in the secure element 320 of the electronic device 300 according to an embodiment. For example, a digital key applet 321 may be installed in the secure element 320 of the electronic device 300 according to an embodiment.

The digital key applet 321 may denote an application installed in a security entity including a secure element, an eSE, a strong box, or a security unit.

The digital key applet 321 may issue and store a digital key. In particular, the digital key applet 321 may receive a digital key generation request from the framework 310 and generate the digital key. According to an embodiment, the digital key applet 321 may store a mailbox that is a storage structure storing specialized information for each digital key.

The framework 310 according to an embodiment may provide a trusted execution environment (TEE) 311 separately provided by an independent secure region. The electronic device 300 according to an embodiment may encrypt a remote control command by using the TEE 311 and transmit the encrypted remote control command, thereby increasing security of remote control. However, it is understood that one or more other embodiments are not limited to the structure shown in FIG. 3, and the framework 310 that does not provide the TEE 311 may be used.

Hereinafter, a method, performed by the electronic device 300 of FIG. 3, of transmitting a remote control command to the vehicle 400 is described below with reference to FIGS. 4A and 4B.

Figure 4A:
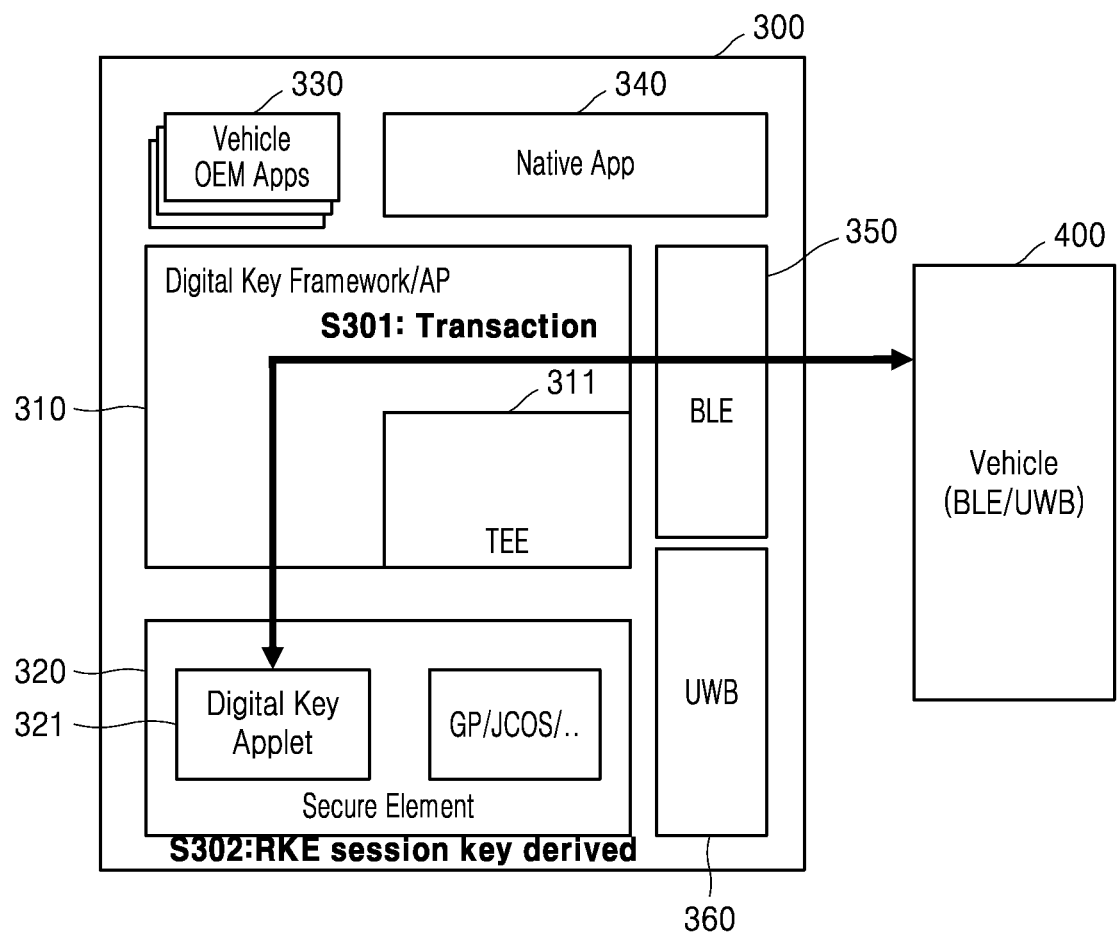
FIG. 4A is a diagram for describing a process in which a vehicle remote control system provides a remote control service, according to an embodiment.

FIG. 4A may be used to describe a process in which a vehicle remote control system generates a remote control service session, according to an embodiment. FIG. 4B is a diagram for describing a process in which a vehicle remote control system provides a remote control service, according to an embodiment.

In operation S301 of FIG. 4A, the electronic device 300 according to an embodiment may perform transactions with the vehicle 400. The digital key applet 321 of the electronic device 300 and the vehicle 400 may perform a mutual authentication procedure using a digital key via a transaction.

For example, the transaction may include a standard transaction or a fast transaction. The transaction may denote the mutual authentication procedure using the digital key between the vehicle 400 and the digital key applet 321 of the electronic device 300, which is defined in the car connectivity consortium (CCC) standard.

In operation S302, the digital key applet 321 according to an embodiment may derive a remote control service session key, i.e., an RKE session key. In the disclosure, a remote control service may denote a service provided by a vehicle available via remote control. The remote control service may also be referred to as RKE.

Figure 4B:
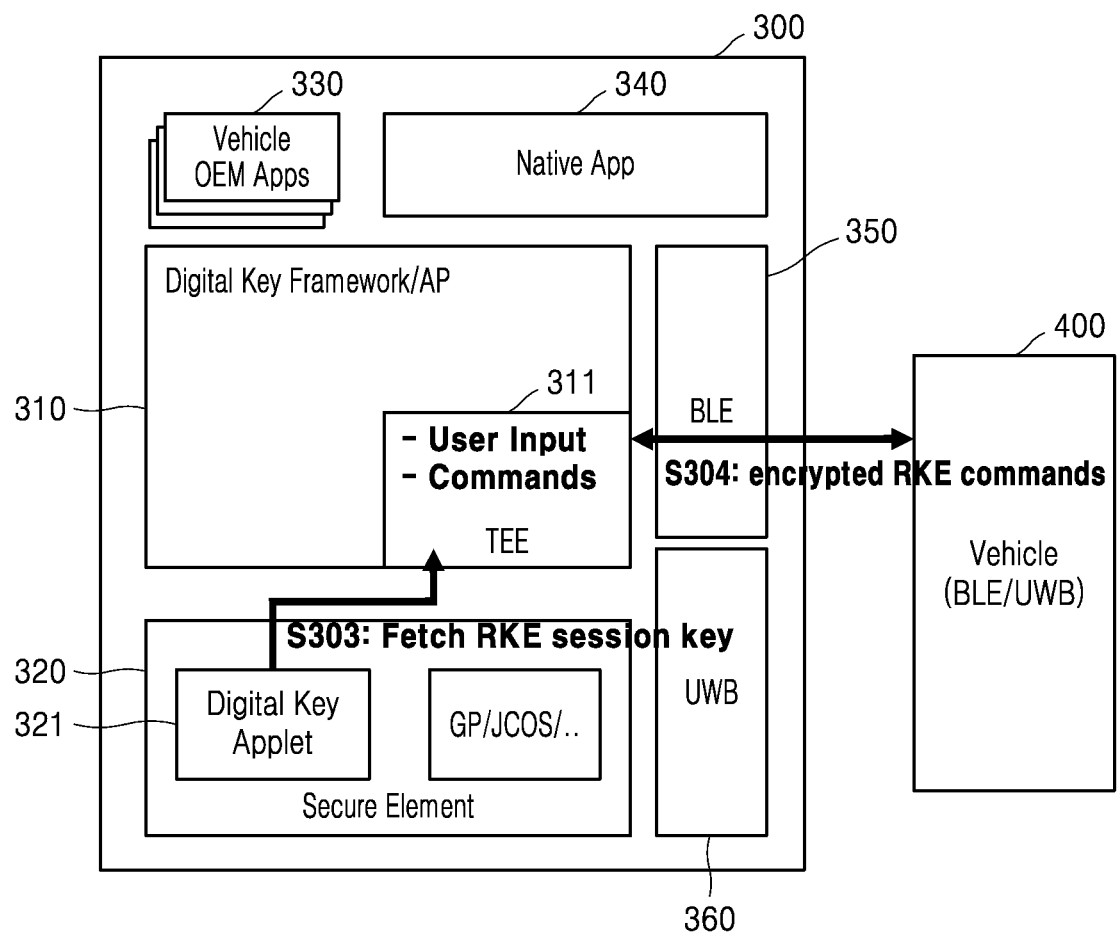
FIG. 4B is a diagram for describing a process in which a vehicle remote control system provides a remote control service, according to another embodiment.

In operation S303 of FIG. 4B, the electronic device 300 may fetch a remote control service session key for the framework 310 from the digital key applet 321. In operation S304, the electronic device 300 may encrypt a remote control command including a user input and commands by using the remote control service session key. The electronic device 300 may transmit the encrypted remote control command to the vehicle 400.

According to an embodiment, an intermediate entity (for example, the framework 310) may relay information exchanged between the digital key applet 321 and the vehicle 400 or between the TEE 311 and the vehicle 400. However, only final ends may be described while omitting an intermediate entity from the description of end-to-end information exchange.

As shown in FIG. 4B, the electronic device 300 according to an embodiment may fetch information related to encryption (for example, the remote control service session key and an encryption key) stored in the digital key applet 321 to the framework 310 from the digital key applet 321 in the secure element 320 to continuously and quickly encrypt and transmit a plurality of remote control commands.

According to procedures described with reference to FIG. 2, the electronic device 101 accesses the secure element 107 and signs (e.g., needs to access and sign) by using a digital key stored in the secure element 107 whenever a remote control command is transmitted to the vehicle 103. However, according to an embodiment described with reference to FIGS. 4A and 4B, the framework 310 may encrypt a plurality of remote control commands by using information related to encryption fetched from the digital key applet 321. Thus, according to an embodiment, the electronic device 300 does not need to access the secure element 320 whenever the plurality of remote control commands are transmitted.

FIGS. 3, 4A, and 4B illustrate an example in which the electronic device 300 transmits a remote control command to the vehicle 400, according to an embodiment. The vehicle 400 may be a device that controls at least some functions of a vehicle. However, various embodiments are not limited to communication between the electronic device 300 and the vehicle 400. The electronic device 300 may communicate with various target devices and transmit a remote control command.

For example, the target device may be embodied in various forms, including a smart TV, a set-top box, a mobile phone, a vehicle, a tablet PC, a digital camera, a laptop computer, a desktop computer, an electronic book terminal, a digital broadcasting terminal, a PDA, a PMP, a navigation device, an MP3 player, a wearable device, etc. However, the target device is not limited thereto and may be any device capable of communicating with a server via a network and capable of communicating with the electronic device 300 via short distance wireless communication.

For example, the target device may be provided at a gate of a vehicle, a hotel, a house, a building, an amusement park, a ski resort, etc., and control opening or closing of the gate based on a remote control command received from the electronic device 300. Alternatively, the target device may be provided in a vehicle to control opening or closing of a door of the vehicle, air conditioning, engine start, parking, driving, etc., based on a remote control command received from the electronic device 300.

Hereinafter, a method, performed by the electronic device 300, of transmitting a control command to a target device, according to an embodiment is described in detail with reference to FIG. 5.

Figure 5:
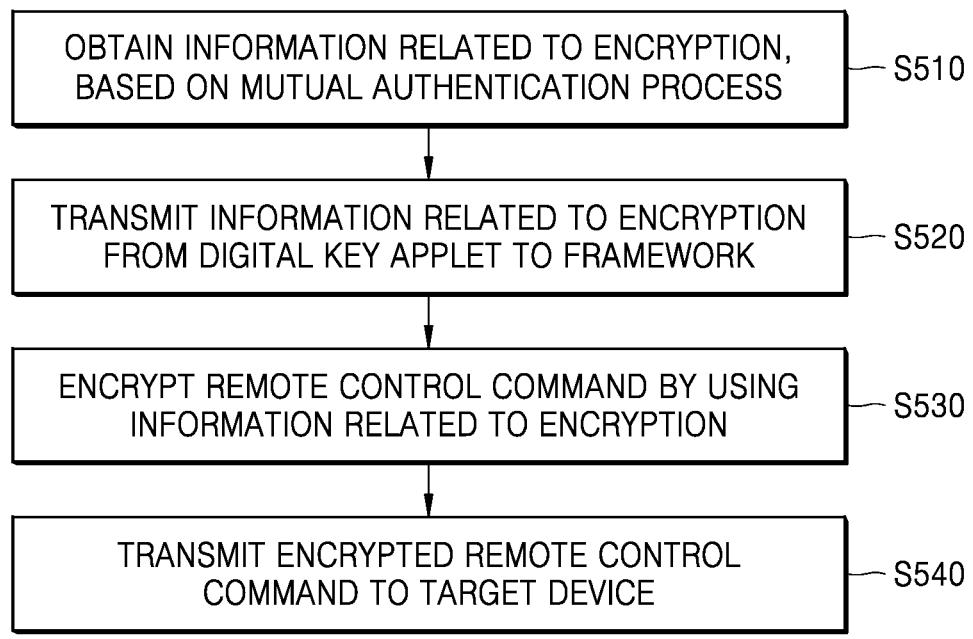
FIG. 5 is a flowchart of a method, performed by an electronic device, of transmitting a control command to a target device, according to an embodiment.

FIG. 5 is a flowchart of the method, performed by the electronic device 300, of transmitting a control command to a target device, according to an embodiment.

Referring to FIG. 5, in operation S510, the electronic device 300 according to an embodiment may obtain information related to encryption, based on a mutual authentication process between the electronic device 300 and the target device. The electronic device 300 may obtain, from the digital key applet 321 in the secure element 320, the information related to encryption and store the information related to encryption.

The electronic device 300 may perform mutual authentication with the target device and obtain an encryption key as the information related to encryption.

During the mutual authentication process according to an embodiment, the electronic device 300 may receive an ephemeral public key of the target device from the target device and transmit an ephemeral public key of the electronic device 300 to the target device. The electronic device 300 may receive, from the target device, first data in which information including the ephemeral public key of the target device and the ephemeral public key of the electronic device 300 is signed with a secret key of the target device. The electronic device 300 may verify the first data by using a public key of the target device. The electronic device 300 may transmit, to the target device, second data in which the information including the ephemeral public key of the target device and the ephemeral public key of the electronic device 300 is signed with a secret key of the electronic device 300.

The electronic device 300 may obtain the encryption key from the digital key applet 321 by using the ephemeral public key of the target device and an ephemeral secret key of the electronic device 300 received during the mutual authentication process.

For example, the electronic device 300 may obtain the encryption key as a part of the mutual authentication process. Further, the electronic device 300 may additionally calculate the encryption key when calculating a message authentication code key while performing the mutual authentication process in the digital key applet 321.

As another example, the electronic device 300 may generate the encryption key in response to triggering of the target device. The electronic device 300 may receive a generation request for the encryption key from the target device. The electronic device 300 may obtain the encryption key, based on the generation request received from the target device. For example, the target device may transmit, to the electronic device 300, a command where a parameter related to the generation request for the encryption key is configured.

As another example, the electronic device 300 may generate the encryption key during an initial transaction with the target device. The electronic device 300 may identify a parameter indicating that the mutual authentication process is initial mutual authentication, based on a command received from the target device during the mutual authentication process with the target device. When (or based on) it is determined that the mutual authentication process is the initial mutual authentication based on the identified parameter, the electronic device 300 may obtain the encryption key.

As another example, the electronic device 300 may receive the encryption key from the target device. The electronic device 300 may perform the mutual authentication with the target device and obtain the encryption key from the target device by using a secure channel generated via the mutual authentication.

According to another embodiment, the electronic device 300 may generate a symmetric long-term key, based on a key exchange process between the electronic device 300 and the target device. For example, the electronic device 300 may generate the symmetric long-term key after performing SPAKE2+(simple password authenticated key exchange). The symmetric long-term key may be generated in the framework 310 of the electronic device 300. Then, the electronic device 300 may perform the mutual authentication with the target device. The digital key applet 321 of the electronic device 300 may obtain a nonce during the mutual authentication process. For example, the nonce may be a new value generated for each mutual authentication. The digital key applet 321 may use the nonce as the information related to encryption.

Moreover, the electronic device 300 according to another embodiment may perform the mutual authentication with the target device and then obtain a session key as the information related to encryption.

The electronic device 300 may receive the generation request for the encryption key from the target device. The digital key applet 321 of the electronic device 300 may generate the encryption key by using the ephemeral public key of the target device received during the mutual authentication process, based on the generation request for the encryption key. The electronic device 300 may receive, from the target device, a generation request for a session key including the nonce. The digital key applet 321 of the electronic device 300 may obtain the session key (e.g., secure passthrough session key (SPSK)) by using the nonce and the encryption key, based on the generation request for the session key. The digital key applet 321 may obtain the session key as encryption information.

In operation S520, the electronic device 300 may transmit the information related to encryption to the framework 310 from the digital key applet 321 installed on the secure element 320 of the electronic device 300. The electronic device 300 may receive the information related to encryption to the TEE 311 in the framework 310.

According to various embodiments, the information related to encryption may include at least one of an encryption key obtained by using an ephemeral key received during a mutual authentication process, a nonce obtained during the mutual authentication process, or a session key (SPSK) obtained by using the encryption key and the nonce.

In operation S530, the electronic device 300 may encrypt a remote control command by using the information related to encryption. The framework 310 of the electronic device 300 may encrypt the remote control command by using the information related to encryption received from the digital key applet 321.

The electronic device 300 may obtain the remote control command to which a user input is reflected. For example, the remote control command may be generated by the framework 310 of the electronic device 300, based on the user input. Alternatively, the remote control command may be generated by another application, based on the user input.

The electronic device 300 may encrypt the remote control command by the TEE 311 in the framework 310.

The framework 310 of the electronic device 300 according to an embodiment may obtain the encryption key by using the nonce and the symmetric long-term key when (or based on) the nonce is obtained as the information related to encryption in operation S520. The electronic device 300 may encrypt the remote control command by using the encryption key obtained by using the nonce and the symmetric long-term key.

The framework 310 of the electronic device 300 may encrypt the remote control command by using the session key when the session key is obtained as the information related to encryption in operation S520.

In operation S540, the electronic device 300 may transmit the encrypted remote control command to the target device.

The target device may decrypt the encrypted remote control command and perform a certain operation corresponding to the remote control command. Also, the target device may transmit, to the electronic device 300, a result of performing the certain operation corresponding to the remote control command. The electronic device 300 may receive, from the target device, information related to a status of the target device, and update status information of the target device.

Hereinafter, a process, performed by the target device, of receiving an encrypted remote control command from the electronic device 300, according to an embodiment, is described below with reference to FIG. 6.

Figure 6:
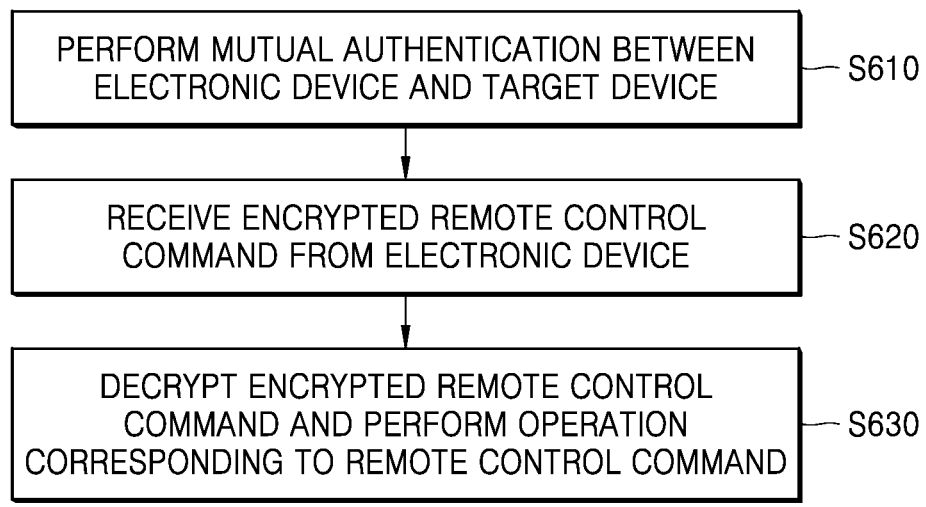
FIG. 6 is a flowchart of an operating method of a target device according to a remote control command, according to an embodiment.

FIG. 6 is a flowchart of an operating method of the target device according to the remote control command, according to an embodiment.

For the target device to decrypt the encrypted remote control command, the encryption key or session key used by the electronic device 300 is required. Thus, the target device may perform at least some of the operations performed by the electronic device 300 in operations S510 through S530 of FIG. 5, to obtain the encryption key or the session key. Descriptions that are the same or substantially similar to those provided with reference to FIG. 5 may not be repeated below.

Referring to FIG. 6, in operation S610, the target device according to an embodiment may perform mutual authentication with the electronic device 300. The target device may obtain the information related to encryption, based on the mutual authentication process with the electronic device 300.

For example, the information related to encryption may include at least one of an encryption key obtained by using an ephemeral key received during a mutual authentication process, a nonce obtained during the mutual authentication process, or a session key (SPSK) obtained by using the encryption key and the nonce.

In operation S620, the target device may receive the encrypted remote control command from the electronic device 300. The encrypted remote control command received by the target device may be the remote control command encrypted by using the encryption key or the session key in operation S530 of FIG. 5.

In operation S630, the target device may decrypt the encrypted remote control command.

The target device may obtain the encryption key or the session key from the information related to encryption obtained during the mutual authentication process with the electronic device 300. The target device may decrypt the encrypted remote control command by using the encryption key or the session key.

The target device may perform a certain operation corresponding to the remote control command, based on the decrypted remote control command.

Also, the target device may transmit, to the electronic device 300, a result of performing the certain operation corresponding to the remote control command. The electronic device 300 may receive, from the target device, information related to a status of the target device, and update status information of the target device.

Hereinafter, a method, performed by the electronic device 300, of transmitting a control command to the target device by using the TEE 311 of the framework 310, according to an embodiment, is described in detail below with reference to FIG. 7.

Figure 7:
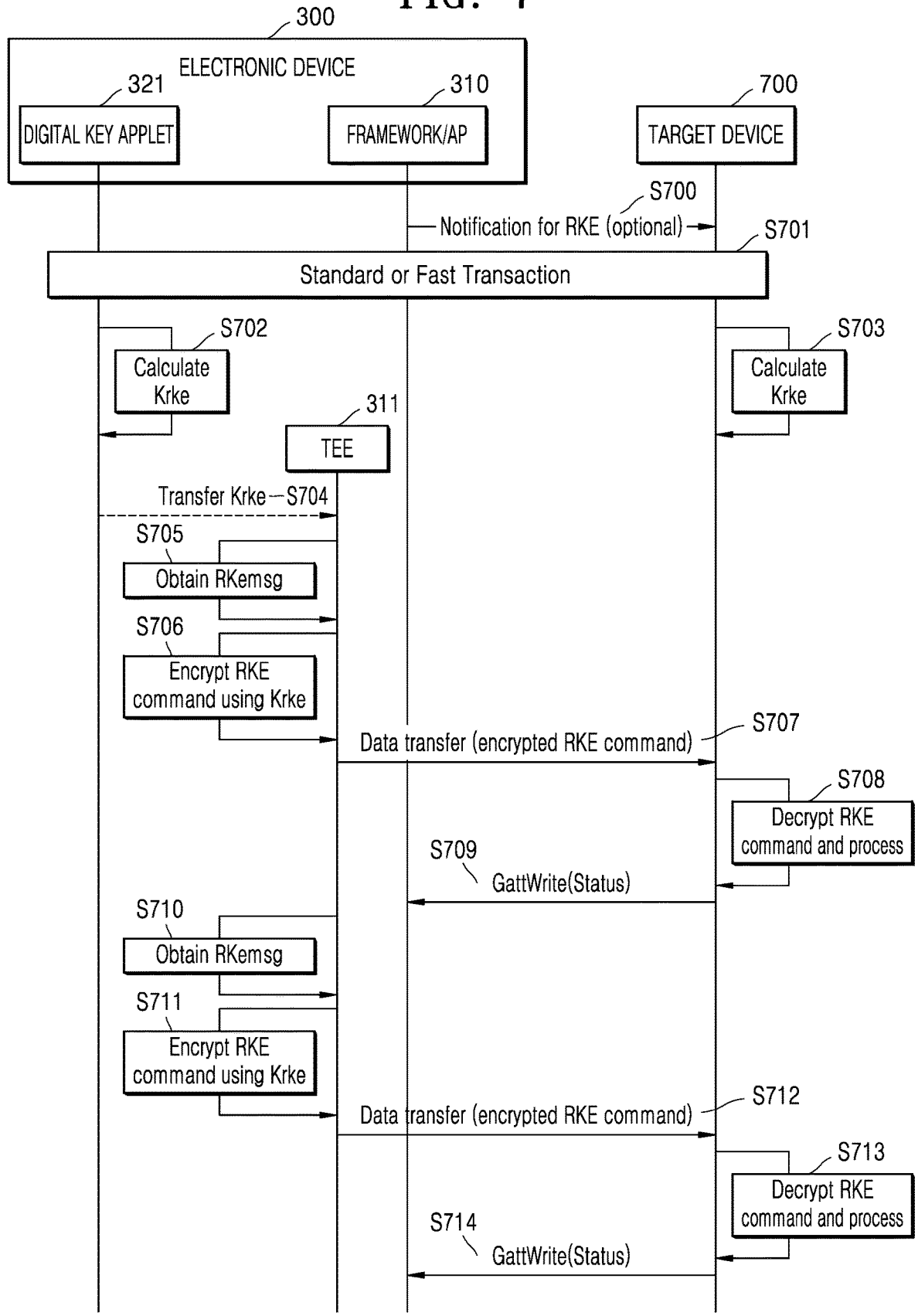
FIG. 7 illustrates an example of a method, performed by an electronic device, of transmitting a control command to a target device, according to an embodiment.

FIG. 7 illustrates an example of a method, performed by the electronic device 300, of transmitting a control command to a target device 700, according to an embodiment.

In FIG. 7, it is assumed that a BLE connection is established between the electronic device 300 and the target device 700.

Referring to FIG. 7, in operation S700, the framework 310 of the electronic device 300 transmits, to the target device 700, a notification to perform a process for transmitting a remote control command. Operation S700 may be omitted depending on implementation.

In operation S701, the target device 700 and the digital key applet 321 of the electronic device 300 may perform transactions. The transactions may include a standard transaction or a fast transaction, and may denote a mutual authentication procedure.

In operation S701, the target device 700 and the digital key applet 321 of the electronic device 300 may perform mutual authentication.

In operation S702, the digital key applet 321 may calculate an encryption key Krke to be used by the digital key applet 321 to transmit a remote control message. For example, the digital key applet 321 may calculate the encryption key Krke as a part of the mutual authentication procedure. The digital key applet 321 may additionally calculate the encryption key Krke when calculating a key and a message authentication code key during mutual authentication, as shown in Table 1.

TABLE 1 keying_material_length ← 80
compute derived_keys according to Listing 15-38 using
nvm.endpoint.Kpersistent, info, keying_material_length TABLE 1-continued

```
KCmac ← subset of derived_keys at offset 0 with length 16
cod.Kenc ← subset of derived_keys at offset 16 with length 16
cod.Kmac ← subset of derived_keys at offset 32 with length 16
cod.Kmac ← subset of derived_keys at offset 48 with length 16
Krke ← subset of derived_keys for remote key message at offset
    64 with length 16
```

Table 1 illustrates a procedure of processing an AUTH0 command defined by the CCC standard. The AUTH0 command is used by the target device 700 to request the electronic device 300 to perform an authentication procedure.

In operation S703, the target device 700 may calculate the encryption key Krke in the same or substantially similar manner as the digital key applet 321.

In operation S704, the digital key applet 321 may transmit the encryption key Krke to the TEE 311 of the framework 310. In operation S705, the TEE 311 may obtain a remote control command RkeMsg. For example, the remote control command RkeMsg may be generated by the framework 310 or the TEE 311 based on a user input or by another application based on the user input.

In operation S706, the TEE 311 may encrypt the remote control command RkeMsg by using the encryption key Krke.

In operation S707, the TEE 311 may transmit the encrypted remote control command RkeMsg to the target device 700. In operation S708, the target device 700 may decrypt the received encrypted remote control command RkeMsg to identify the remote control command RkeMsg. The target device 700 may perform an operation corresponding to the remote control command RkeMsg.

In operation S709, the target device 700 may update a target device status change by transmitting, to the framework 310, the target device status change depending or based on the performed operation corresponding to the remote control command RkeMsg.

For example, when the target device 700 is a vehicle, a vehicle status change may be updated. A status of the vehicle may include a door lock/unlock status or an engine start status.

Operations S710 through S714 are respectively the same as or substantially similar to operations S705 through S709 described above. As shown in FIG. 7, the electronic device 300 according to an embodiment may perform one transaction with the target device 700, and then transmit a plurality of remote control commands RkeMsg to the target device 700 via the TEE 311. The TEE 311 may encrypt the plurality of remote control commands RkeMsg by using the encryption key Krke received in operation S704. Accordingly, the electronic device 300 may encrypt and transmit the remote control commands RkeMsg without having to access the digital key applet 321 every time the remote control commands RkeMsg are transmitted.

Figure 8:
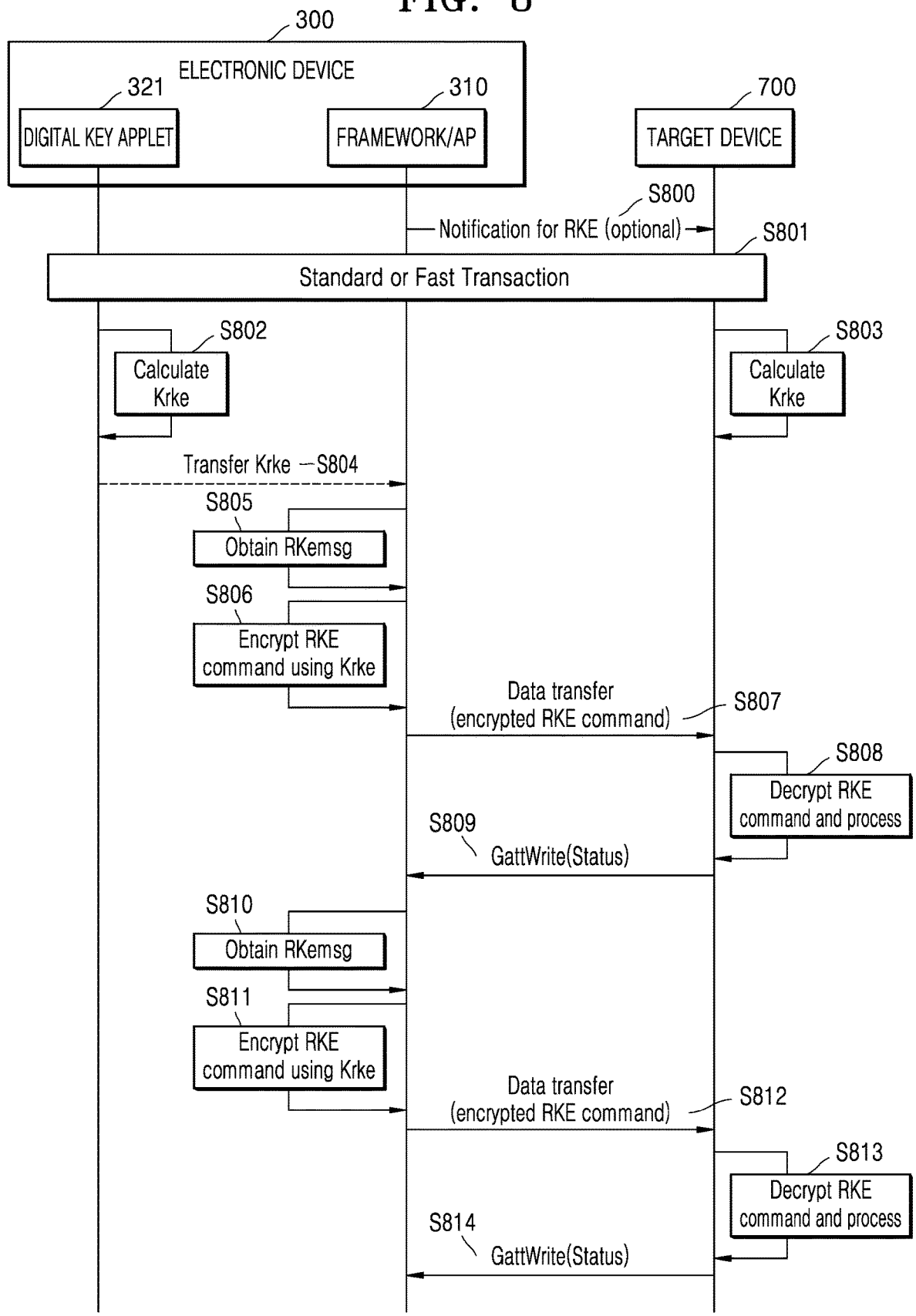
FIG. 8 illustrates an example of a method, performed by an electronic device, of transmitting a control command to a target device, according to another embodiment.

The electronic device 300 according to an embodiment may transmit the remote control command RkeMsg to the target device 700 by using the TEE 311 as shown in FIG. 7. It is understood, however, that one or more other embodiments are not limited to the example shown in FIG. 7. As shown in FIG. 8, the electronic device 300 according to an embodiment may transmit the remote control command RkeMsg from the framework 310 providing security of a service level without using the TEE 311.

FIG. 8 illustrates an example of a method, performed by the electronic device 300, of transmitting the remote control command RkeMsg to the target device 700, according to another embodiment.

Operations S800 through S814 of FIG. 8 are respectively the same as or substantially similar to operations S700 through S714 of FIG. 7 except that in FIG. 7, operations S704, S705, S706, S710, and S711 are performed by the TEE 311, whereas in FIG. 8, operations S804, S805, S806, S810, and S811 are performed by the framework 310 of a service level instead of the TEE 311 of a high secure level. Thus, redundant descriptions thereof may not be repeated below.

As described above, the electronic device 300 according to an embodiment may encrypt the remote control command RkeMsg by using the encryption key Krke and transmit the remote control command RkeMsg. The encryption key Krke is a digital key used to safely protect instructions and data transmitted via BLE.

For example, the electronic device 300 may automatically obtain the encryption key Krke as a part of the mutual authentication process. For example, the electronic device 300 may additionally calculate the encryption key Krke while performing the mutual authentication process inside the digital key applet 321.

As another example, the electronic device 300 may generate the encryption key Krke in response to (or based on) triggering of the target device 700.

The electronic device 300 may receive a generation request for the encryption key Krke from the target device 700. The target device 700 may request the digital key applet 321 of the electronic device 300 to generate the encryption key Krke, by using an AUTH0 command defined in the CCC standard. For example, the target device 700 may request generation of the encryption key Krke by configuring a certain parameter of the AUTH0 command as in Table 2 and transmitting the certain parameter to the digital key applet 321.

TABLE 2

| Description |
| --- |
| P1 bits 0-7:<br>    bit 0 Fast(1)/Standard(0) transaction request<br>    bit 1 RFU (shall be set to 0)<br>    bit 2 EXCHANGE commands will(1)/might(0) be sent during current transaction<br>    bit 3 RkeMsg Enc key required (1)/not required (0)<br>    bit 4-7 RFU (shall be set to 0)<br>P2 bits 0-7:<br>    bit 0-7 domain specific transaction_code |

Table 2 shows P1 and P2 parameters included in the AUTH0 command defined in the CCC standard. The AUTH0 command of Table 2 includes an encryption key generation request parameter.

When bit3 of the P1 parameter included in the AUTH0 command received by the electronic device 300 from the target device 700 is configured to 1, the electronic device 300 may determine that a key RkeMsgEnckey for encrypting a remote control message is requested to be generated. When the key RkeMsgEnckey for encrypting the remote control message is requested to be generated, the digital key applet 321 calculates the encryption key Krke.

A method by which the target device 700 requests generation of the encryption key KrKe is not limited to a method of configuring a parameter included in the AUTH0 command. For example, the target device 700 may transmit, to the electronic device 300, a separate command requesting generation of the key RkeMsgEnckey for encrypting the remote control message.

As another example, the electronic device 300 may generate the encryption key Krke during initial transaction with the target device 700.

The target device 700 may notify the electronic device 300 that a transaction being currently performed for mutual authentication is a transaction performed first after BLE connection between the electronic device 300 and the target device 700, during the mutual authentication between the electronic device 300 and the target device 700.

TABLE 3

| Description |
| --- |
| P1 bits 0-7:<br>    bit 0 Fast(1)/Standard(0) transaction request<br>    bit 1 RFU (shall be set to 0)<br>    bit 2 EXCHANGE commands will(1)/might(0) be sent during current transaction<br>    bit 3 Initial transaction (1)/not initial transaction (0)<br>    bit 4-7 RFU (shall be set to 0) |
| P2 bits 0-7:<br>    bit 0-7 domain specific transaction_code |

Table 3 shows the P1 and P2 parameters included in the AUTH0 command defined in the CCC standard. The AUTH0 command of Table 3 includes a parameter indicating an initial transaction.

The digital key applet 321 may determine that the transaction currently being performed is the initial transaction after BLE connection, when (or based on) the bit3 of the P1 parameter included in the AUTH0 command received from the target device 700 is configured to 1. When (or based on) the initial transaction is determined, the digital key applet 321 calculates the encryption key Krke.

As another example, the electronic device 300 may receive the encryption key Krke from the target device 700.

Figure 9:
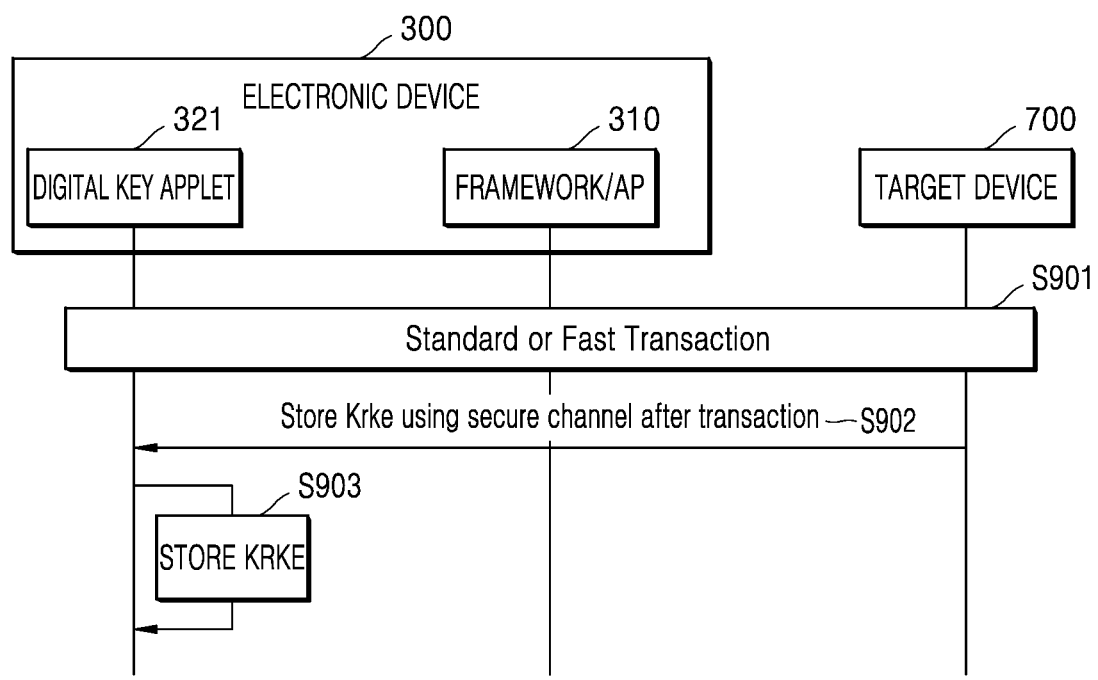
FIG. 9 is a flowchart of a method, performed by an electronic device, of obtaining an encryption key from a target device, according to an embodiment.

FIG. 9 is a flowchart of a method, performed by the electronic device 300, of obtaining the encryption key Krke from the target device 700, according to an embodiment.

As shown in FIG. 9, the digital key applet 321 of the electronic device 300 according to an embodiment may receive, from the target device 700, and store the encryption key Krke.

Referring to FIG. 9, in operation S901, the target device 700 and the digital key applet 321 may perform one or more transactions. After the transaction is performed, communication between the target device 700 and the digital key applet 321 is enabled via a secure channel.

In operation S902, the target device 700 may transmit the encryption key Krke to the digital key applet 321 by using the secure channel generated in operation S901. In operation S903, the electronic device 300 may store the encryption key Krke in the digital key applet 321.

For example, the target device 700 may transmit data including the encryption key Krke to the digital key applet 321 as in Table 4 below.

TABLE 4

| Tag | Length | Description | Field is |
| --- | --- | --- | --- |
| xx | xx | Krke, key for remote command encryption | mandatory |

As another example, the target device 700 may store the encryption key Krke in a mailbox in the digital key applet 321 by using an exchange command. The mailbox is a storage structure storing information specialized for each digital key and may be stored in the digital key applet 321. For example, the exchange command is a command defined in the CCC standard and is a command enabling data to be read from, written on, or set in the mailbox.

Figure 10:
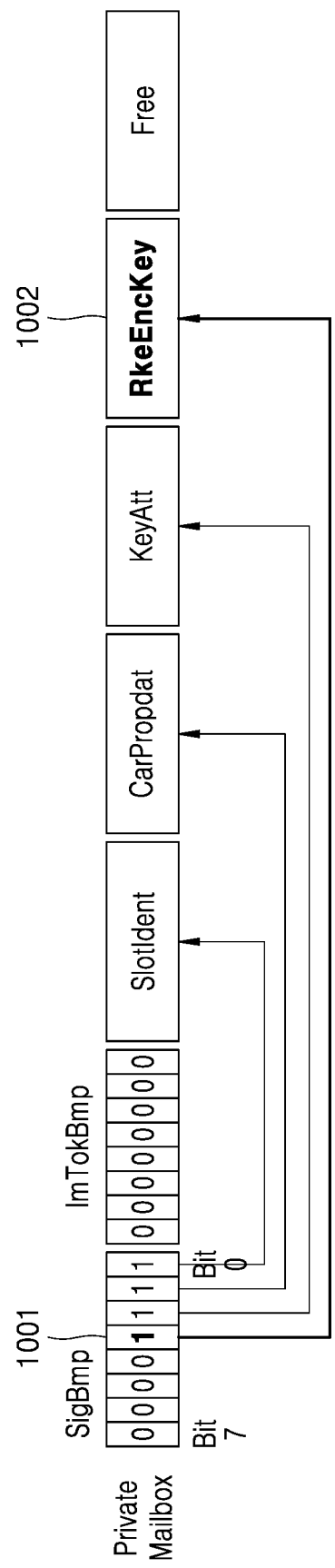
FIG. 10 illustrates a structure of a mailbox in a digital key applet used by an electronic device to store an encryption key, according to an embodiment.

FIG. 10 illustrates a structure of a mailbox in the digital key applet 321 used by the electronic device 300 to store an encryption key RkeEncKey, according to an embodiment.

The target device 700 may store a key for encrypting a remote control message (i.e., RkeMsgEnckey 1002) in the mailbox by using an exchange command and set a bit 1001, which corresponds to the key, of SigBmp to 1.

The digital key applet 321 may transmit a notification indicating a change in SigBmp to the framework 310 or the TEE 311. Alternatively, the digital key applet 321 may transmit, to the framework 310 or the TEE 311, a notification indicating that the key RkeMsgEnckey 1002 for encrypting the remote control message is stored. The framework 310 or the TEE 311 reads the key RkeMsgEnckey 1002 from the mailbox of the digital key applet 321 by using a private data obtainment command (GET PRIVATE DATA command).

Moreover, the framework 310 of the electronic device 300 according to an embodiment may use owner pairing to provide security of a service level while transmitting a remote control command. The owner pairing may denote an initial connection process between the target device 700 and the electronic device 300.

According to an embodiment, when the electronic device 300 (for example, a mobile terminal) is initially registered in the target device 700 (for example, a vehicle), a symmetric long-term key for a remote control service may also be generated and registered.

Hereinafter, a method of safely transmitting the remote control command by using the symmetric long-term key generated during an owner pairing process between the electronic device 300 and the target device 700, according to an embodiment, is described in detail below with reference to FIGS. 11 and 12.

Figure 11:
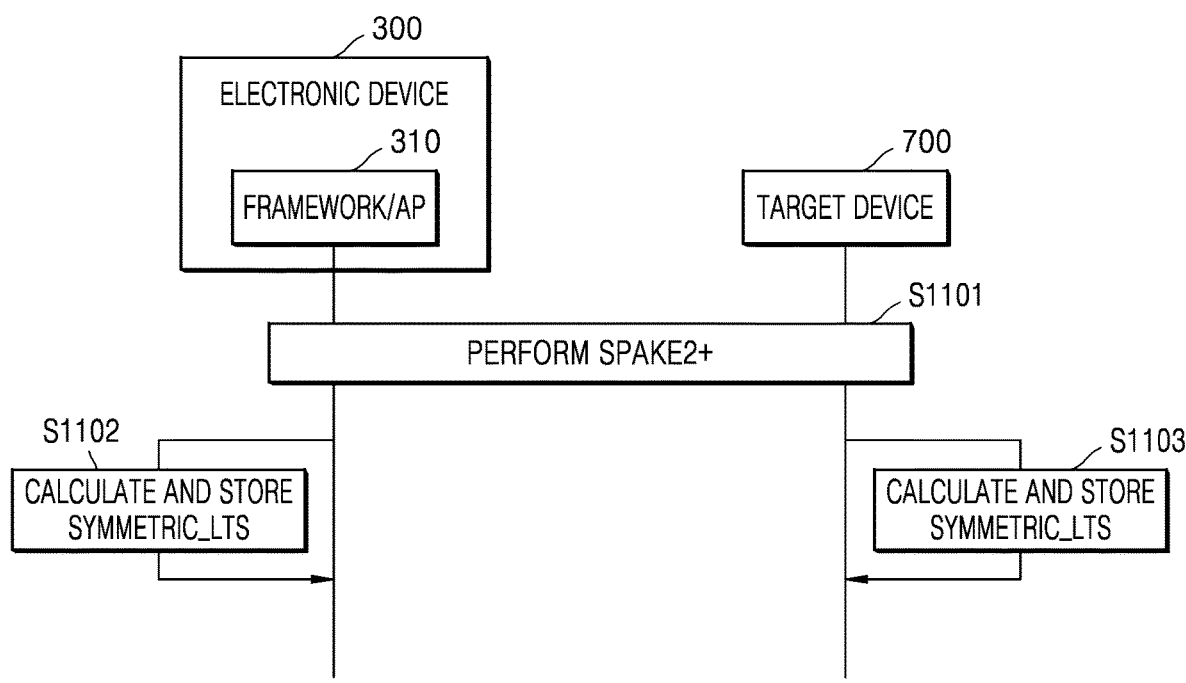
FIG. 11 is a flowchart of a method, performed by an electronic device, of obtaining a symmetric long-term key, according to an embodiment.

FIG. 11 is a flowchart of a method, performed by the electronic device 300, of obtaining a symmetric long-term key according to an embodiment.

As shown in FIG. 11, according to an embodiment, an encryption key to be used by the electronic device 300 and the target device 700 may be generated during owner pairing.

Referring to FIG. 11, in operation S1101, SPAKE2+ may be performed between the framework 310 and the target device 700. SPAKE2+ is a method by which the target device 700 verifies an owner of the target device 700 and may be performed during the owner pairing.

For example, SPAKE2+ may be a method by which the target device 700 verifies the electronic device 300 by verifying a password input through the electronic device 300. After SPAKE2+ is performed, the target device 700 and the electronic device 300 may generate a session key that may be used for encryption and/or decryption.

While the session key is generated during SPAKE2+, the framework 310 according to an embodiment may additionally generate and store the symmetric long-term key symmetric_LTS, in operation S1102. The symmetric long-term key is a value that may be equally calculated by the target device 700 and the electronic device 300 by using a value generated after SPAKE2+ is performed. The target device 700 according to an embodiment may also additionally generate and store the same symmetric long-term key symmetric_LTS.

Figure 12:
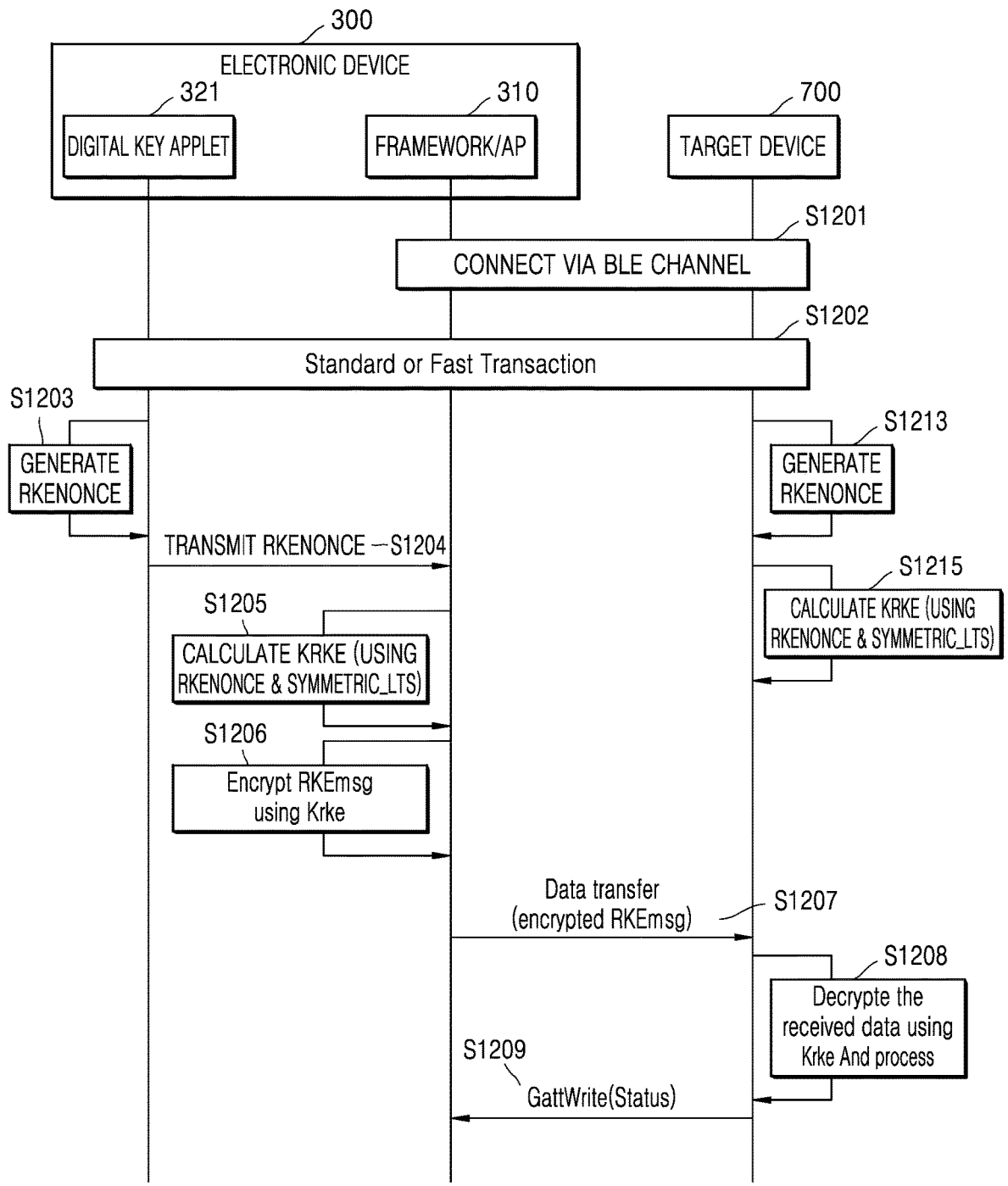
FIG. 12 illustrates another example of a method, performed by an electronic device, of transmitting a control command to a target device, according to an embodiment.

Thereafter, when the remote control message RkeMsg is needed to be transmitted from the electronic device 300 to the target device 700, a method of FIG. 12 may be performed.

FIG. 12 illustrates another example of a method, performed by the electronic device 300, of transmitting a control command to the target device 700, according to an embodiment.

Referring to FIG. 12, in operation S1201, the target device 700 and the framework 310 of the electronic device 300 may be connected to each other via BLE.

In operation S1202, the target device 700 and the digital key applet 321 may perform mutual authentication via a transaction. After the mutual authentication is performed, the digital key applet 321 may calculate a remote control nonce RkeNonce in operation S1203. In operation S1213, the target device 700 may calculate the same remote control nonce RkeNonce.

The remote control nonce RkeNonce is a new value generated for each mutual authentication and may be used to calculate a new value for each mutual authentication when the encryption key Krke is calculated by using the symmetric long-term key symmetric_LTS. The remote control nonce RkeNonce may be generated by using a same method as methods of generating the encryption key Krke described above with reference to Table 2, Table 3, Table 4, FIG. 9, and FIG. 10.

For example, the remote control nonce RkeNonce may be additionally calculated while a key, a message authentication code key, and the like are calculated during the mutual authentication as shown in Table 5.

TABLE 5 keying_material_length ← 80
compute derived_keys according to Listing 15-38 using
nvm.endpoint.Kpersistent, info, keying_material_length
KCmac ← subset of derived_keys at offset 0 with length 16
cod.Kenc ← subset of derived_keys at offset 16 with length 16
cod.Kmac ← subset of derived_keys at offset 32 with length 16
cod.Kmac ← subset of derived_keys at offset 48 with length 16
RiceNonce← subset of derived_keys for remote key message at offset 64 with length 16

Table 5 illustrates a procedure of processing an AUTH0 command defined by the CCC standard.

In operation S1204, the digital key applet 321 may transmit the remote control nonce RkeNonce to the framework 310 or the TEE 311.

In operation S1205, upon obtaining the remote control nonce RkeNonce, the framework 310 or the TEE 311 may calculate the encryption key Krke by using the symmetric long-term key symmetric_LTS and the remote control nonce RkeNonce. For example, the encryption key Krke may be derived as in Table 6 below.

TABLE 6

Input: Symmetric_LTK, RkeNonce
output: Krke
begin
   Compute the steps indicated by NIST SP800-108 with the following mapping:
   PRF : CMAC as defined by NIST SP800-38B using AES-128 block cipher
   h : 128
   r : 8
   $K_6$ : Symmetric_LTK
   Label : 0000000000000000000000$_h$ concatenated with $20_h$ for Krke TABLE 6-continued Context : RkeNonce || transaction_identifier || ...
   L : $0080_h$ (AES-128)
   PRF ($K_h$ Label || 00\hex || L || i || Context) : concatenation order
   $K_D$ : Krke (16 Bytes)
end Referring to Table 6, the symmetric long-term key symmetric_LTS is used as a key and the remote control nonce RkeNonce may be used as a derivation context. For example, a transaction identifier of a transaction recently performed between the target device 700 and the digital key applet 321 may be additionally used for the derivation context.

In operation S1215, upon obtaining the remote control nonce RkeNonce, the target device 700 may calculate the encryption key Krke by using the symmetric long-term key symmetric_LTS and the remote control nonce RkeNonce.

Operations S1206 through S1209 of FIG. 12 are respectively the same as or substantially similar to operations S711 through S714 of FIG. 7. Thus, redundant descriptions thereof may not be repeated below.

Moreover, the encryption key Krke or session key (SPSK) according to an embodiment may be used to additionally protect data exchanged between the target device 700 and the electronic device 300. Examples of the data may include a remote control command exchanged between a vehicle and a terminal, a vehicle status, vehicle diagnosis information, and vehicle environment information (an internal temperature, a remote control start alarm, and the like).

According to embodiments described below in comparison with the embodiments described above, a new command may be defined to generate the encryption key Krke. Accordingly, hereinafter, a method by which the electronic device 300 safely transmits a remote control command to the target device 700 by using a command newly defined according to an embodiment is described in detail below with reference to FIGS. 13 through 15. Also, additional operations of the electronic device 300 for generating the encryption key Krke are described in detail below with reference to FIGS. 13 through 15.

Figure 13:
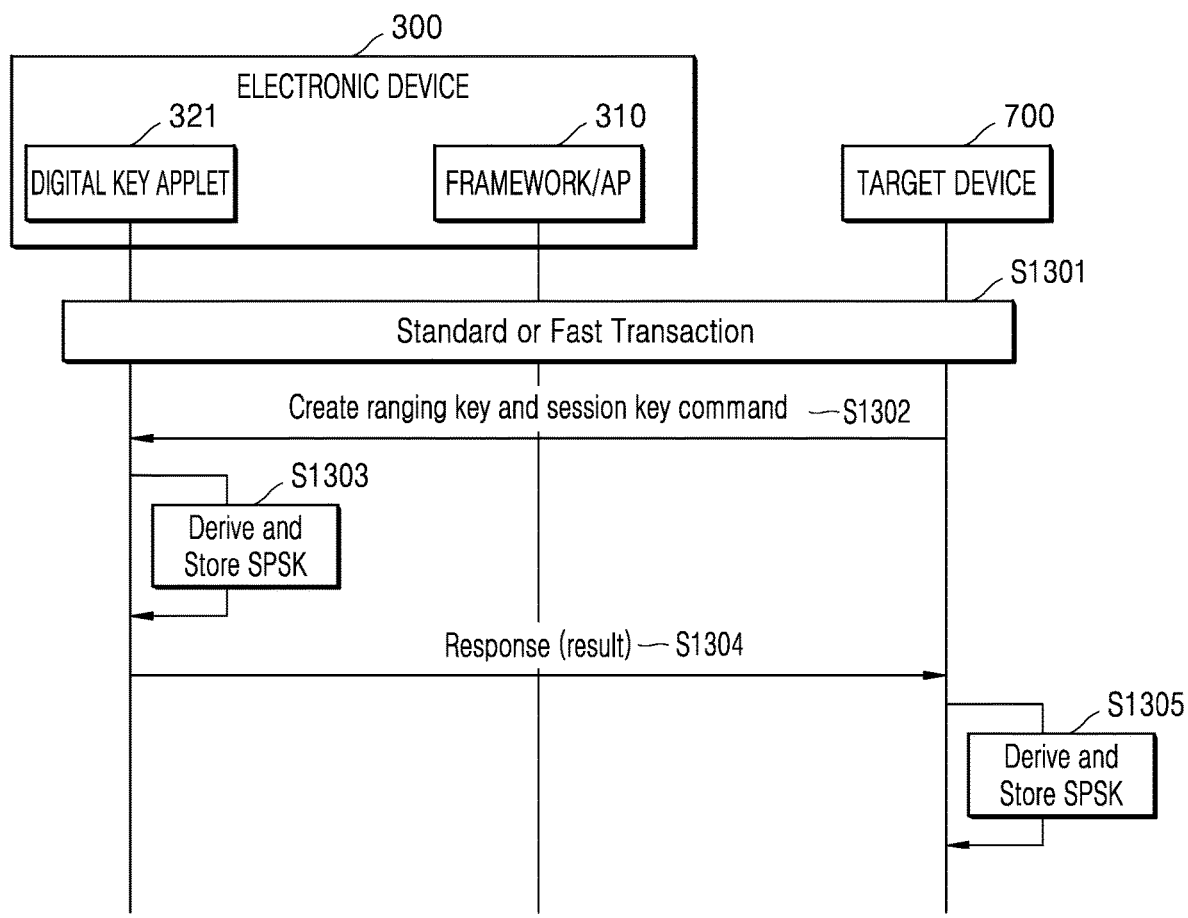
FIG. 13 is a flowchart of a method, performed by an electronic device, of obtaining a session key, according to an embodiment.

FIG. 13 is a flowchart of a method, performed by the electronic device 300, of obtaining a session key, according to an embodiment.

Operations by which the secure element 320 of the electronic device 300 generates the session key (SPSK) are described below with reference to FIG. 13.

Referring to FIG. 13, in operation S1301, the electronic device 300 according to an embodiment may perform mutual authentication via a standard transaction or fast transaction with the target device 700. In operation S1302, the electronic device 300 may receive, from the target device 700, a command to generate a ranging key and the session key. In the secure element 320, a request to generate the session key may be included in another command as a part of the other command or may be a command independent from other commands. In operation S1303, the secure element 320 of the electronic device 300 may generate and store the session key, based on the command of the target device 700. In addition, the session key may be mapped to a digital key identifier and stored.

Here, the digital key identifier is not limited as an intrinsic identifier of a digital key. The digital key identifier may be replaced by information specifying the digital key (for example, an intrinsic identifier assigned from the target device 700 or an intrinsic encryption key identifier assigned when the target device 700 generates a key) or a transaction identifier (or a session identifier) in a mutual authentication process performed before the encryption key Krke is generated, or may additionally include and be stored together with such information.

In operation S1304, the electronic device 300 may transmit a response regarding a result of generating the session key to the target device 700. The result may be status words or status codes of 4 bytes notifying a result of performing an operation.

In operation S1305, the target device 700 may generate and store the session key.

Figure 14:
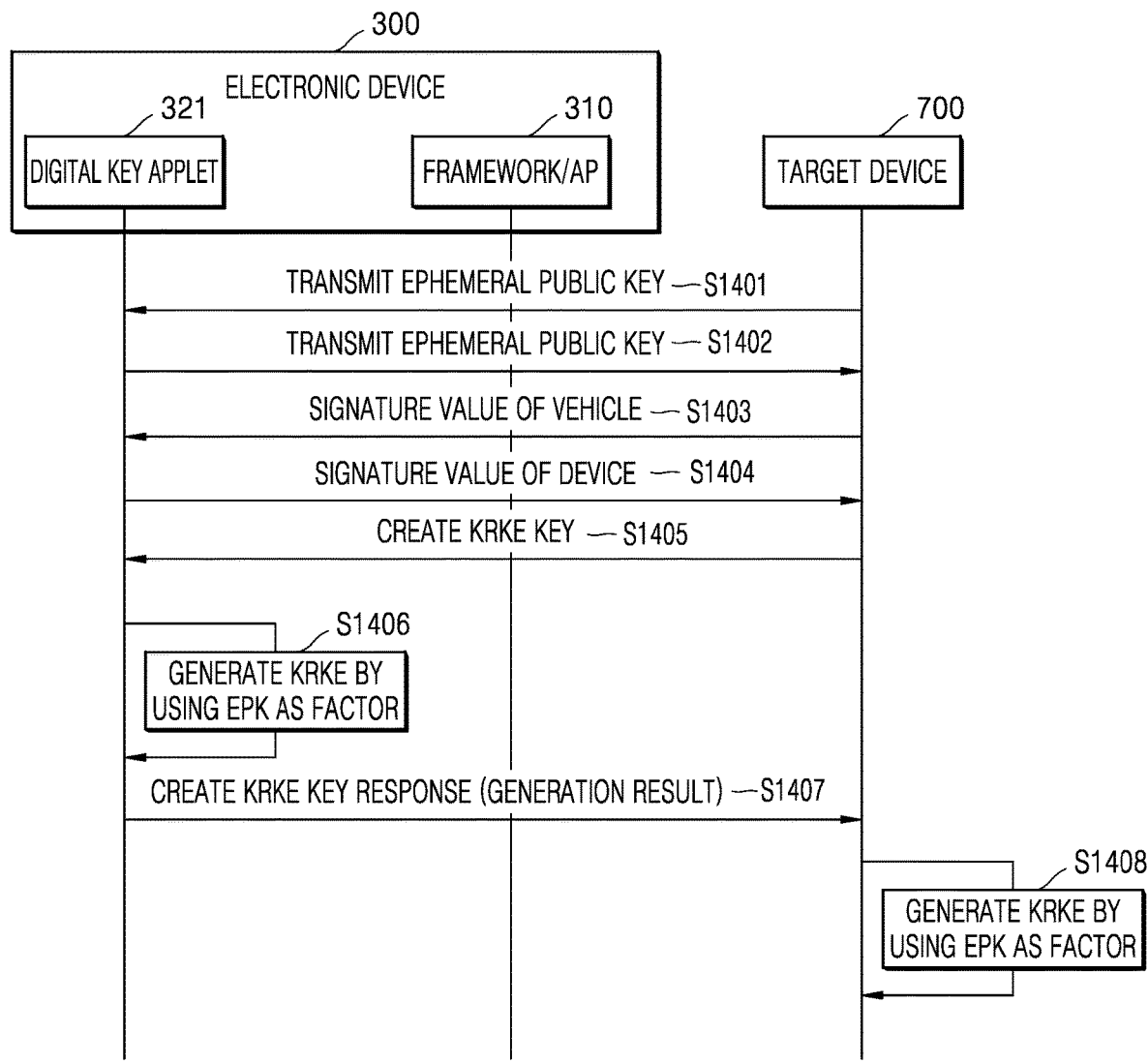
FIG. 14 is a flowchart of a method, performed by an electronic device, of obtaining an encryption key by using information exchanged during a mutual authentication process, according to an embodiment.

FIG. 14 is a flowchart of a method, performed by the electronic device 300, of obtaining the encryption key Krke by using information exchanged during a mutual authentication process, according to an embodiment.

Operations S1401 through S1404 show a mutual authentication method between the electronic device 300 and the target device 700. The electronic device 300 and the target device 700 may perform authentication by verifying each other's signature. It is assumed that the electronic device 300 and the target device 700 pre-possess each other's public key (e.g. PK) corresponding to a secret key (e.g. SK) (or private key) used for a signature. Accordingly, when the target device 700 signs data by using the secret key of the target device 700 and transmits the data to the digital key applet 321 of the electronic device 300, the digital key applet 321 may verify the signature of the target device 700 by using the pre-possessed public key of the target device 700. Similarly, when the electronic device 300 signs data by using the secret key of the electronic device 300 and transmits the data to the target device 700, the target device 700 may verify the signature of the electronic device 300 by using the pre-possessed public key of the electronic device 300.

Referring to FIG. 14, in operation S1401, the target device 700 may generate an ephemeral key pair of the target device 700 including an ephemeral secret key and an ephemeral public key, and transmit the ephemeral public key of the target device 700 to the digital key applet 321 of the electronic device 300. For example, when the target device 700 is a vehicle, the target device 700 may generate an ephemeral public key v.epk of the vehicle and an ephemeral secret key v.esk of the vehicle as an ephemeral key pair.

In operation S1402, the electronic device 300 may generate an ephemeral key pair of the electronic device 300 and transmit an ephemeral public key of the electronic device 300 to the target device 700. For example, the electronic device 300 may generate, as the ephemeral key pair, an ephemeral public key d.epk and an ephemeral secret key d.esk.

In operation S1403, the target device 700 may sign, by using the secret key of the target device 700, information including the ephemeral public key of the target device 700 and the ephemeral public key of the electronic device 300, which are exchanged, and transmit the signed information to the digital key applet 321.

In operation S1404, the digital key applet 321 may verify the received signature of the target device 700 by using the pre-possessed public key of the target device 700. When (or based on) the verification is successful, the digital key applet 321 may sign, by using the secret key of the electronic device 300, the information including the ephemeral public key of the target device 700 and the ephemeral public key of the electronic device 300, which are exchanged, and transmit the signed information to the target device 700. The target device 700 may verify the received signature of the electronic device 300 by using the pre-possessed public key of the electronic device 300.

In operation S1405, the target device 700 may transmit a message requesting generation of the encryption key Krke to the digital key applet 321. In operation S1406, the digital key applet 321 may generate the encryption key Krke by using, as factors, the ephemeral public key of the target device 700 and the ephemeral secret key of the electronic device 300, which are already exchanged.

For example, to generate the encryption key Krke, the electronic device 300 may use a following algorithm.

First, the electronic device 300 may generate a common key by performing elliptic curve cryptography Diffie-Hellman key agreement (ECKA-DH) by using the ephemeral secret key of the electronic device 300 and the ephemeral public key of the target device 700. The encryption key krke may be generated by applying an additional key derivation function, such as a hash function, on the generated common key.

The message requesting the digital key applet 321 to generate the encryption key Krke by the target device 700 in operation S1405 may be a message solely used for an encryption key generation request or a message including a specific field, parameter, or indicator indicating that generation of the encryption key Krke is requested.

In operation S1407, the electronic device 300 may transmit a result of generating the encryption key Krke to the target device 700. The result of generating the encryption key Krke may include information about whether generation of the encryption key Krke is successful or failed.

When (or based on) the electronic device 300 successfully generated the encryption key Krke, the target device 700 may also generate and store the encryption key Krke in operation S1408. The target device 700 may generate the encryption key Krke by using, as factors, the ephemeral public key of the electronic device 300 and the ephemeral secret key of the target device 700, which are already exchanged. A method of using the encryption key Krke generated as above is described below with reference to FIG. 15.

Figure 15:
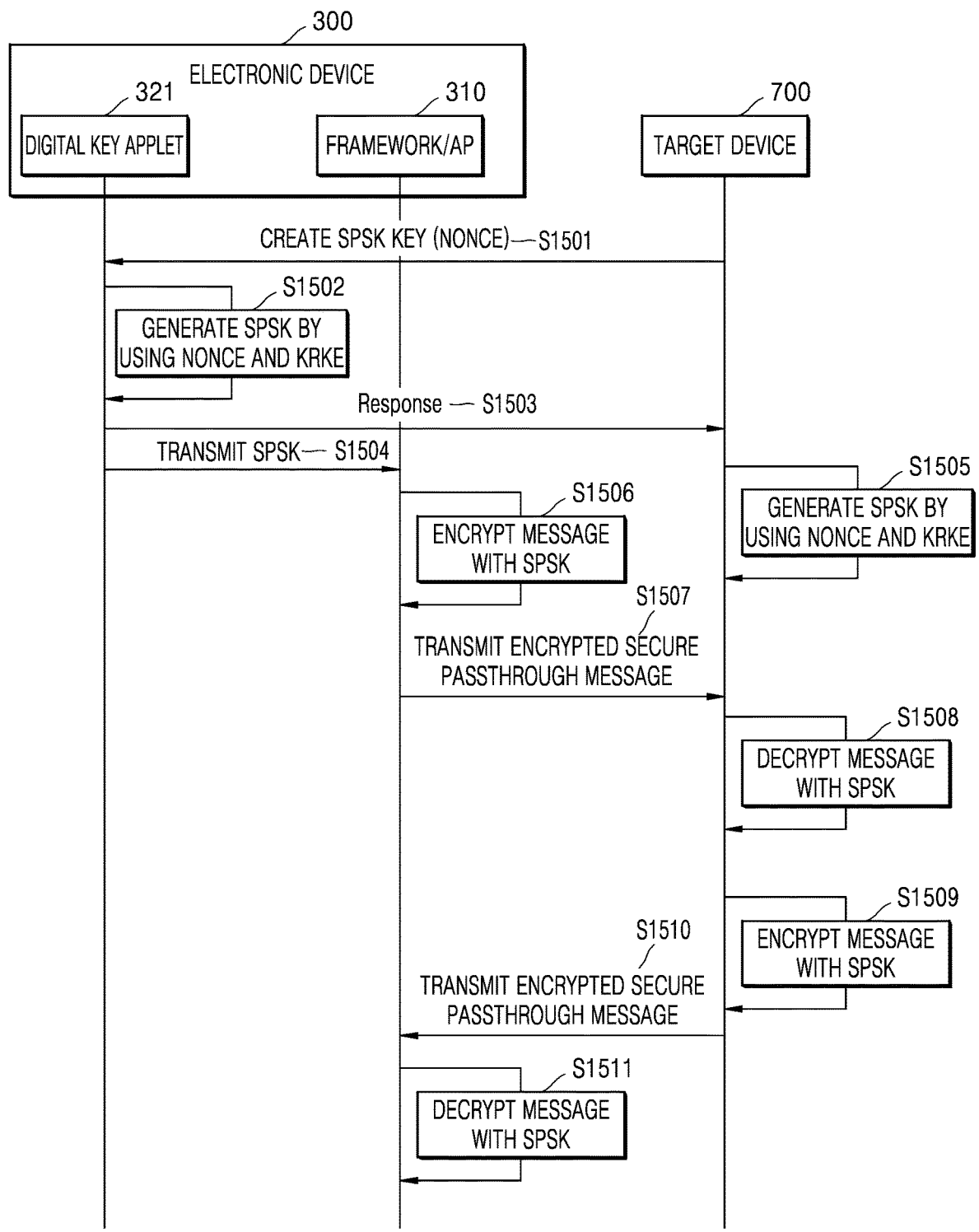
FIG. 15 illustrates another example of a method, performed by an electronic device, of transmitting a control command to a target device, according to an embodiment.

FIG. 15 illustrates another example of a method, performed by the electronic device 300, of transmitting a control command to the target device 700, according to an embodiment.

According to an embodiment, the encryption key Krke may be stored in the digital key applet 321. To safely transmit the remote control message RkeMsg to the target device 700 by encrypting or decrypting the remote control message RkeMsg, the digital key applet 321 may generate a session key (SPSK) by using the encryption key Krke. The digital key applet 321 may transmit the session key to the framework 310 or the TEE 311. The framework 310 (or AP or TEE 311) may perform secure communication by encrypting or decrypting data by using the session key.

Referring to FIG. 15, in operation S1501, the target device 700 may request the digital key applet 321 to generate the session key. A command requesting the session key may include a nonce that is a random value generated by the target device 700. The message requesting the digital key applet 321 to generate the session key by the target device 700 may be a message solely used for a session key generation request or a message including a specific field, parameter, or indicator indicating that generation of the session key is requested. The session key generation request may be directly transmitted from the target device 700 to the digital key applet 321 or indirectly transmitted from the target device 700 to the digital key applet 321 via the framework 310.

In operation S1502, the digital key applet 321 may generate the session key by using the nonce received from the target device 700 and the pre-derived encryption key Krke.

In operation S1503, the digital key applet 321 may transmit a response regarding a result of generating the session key to the target device 700. In operation S1505, upon receiving the result of generating the session key from the digital key applet 321, the target device 700 may also generate the session key by using the nonce and the encryption key Krke.

In operation S1504, the session key may be transmitted from the digital key applet 321 to the framework 310 (or AP or TEE 311).

For example, the framework 310 (or AP or TEE 311) may transmit, to the digital key applet 321, a command for receiving the session key and receive the session key in response to the command.

In operations S1506 through S1511, the framework 310 (or AP or TEE 311) of the electronic device 300 and the target device 700 may perform secure communication by encrypting or decrypting a message (for example, a remote control message) or calculating or verifying media access control (MAC), by using the session key.

Moreover, according to an embodiment, the remote control message may be transmitted by using a mailbox in the digital key applet 321.

A UWB digital key according to an embodiment may support remote key services. To support the remote key services, an existing mailbox mechanism may be used to transmit the remote control message (e.g. Remote Key Entry message, RkeMsg) from the electronic device 300 to the target device 700.

Figure 16:
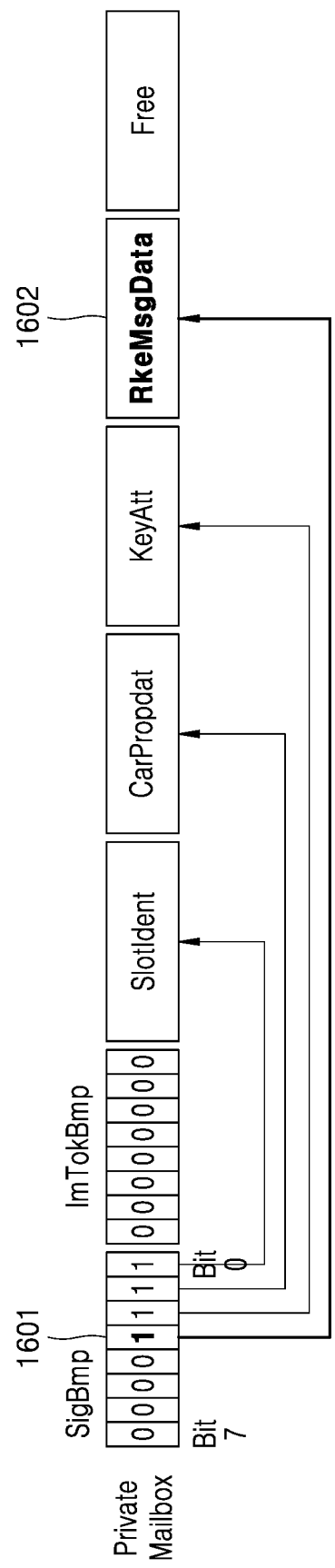
FIG. 16 illustrates a structure of a mailbox in a digital key applet used by an electronic device to store a remote control command, according to an embodiment.

FIG. 16 illustrates a structure of a mailbox in the digital key applet 321 used by the electronic device 300 to store the remote control command RkeMsg, according to an embodiment.

As shown in FIG. 16, a field 1602 for storing a remote control message (e.g. RkeMsg) may be newly defined in a private mailbox as RkeMsgData. When the field 1602 is changed, bit4 1601 is configured in SigBmp.

The electronic device 300 may store the remote control message (e.g., RkeMsg) in the mailbox and set a bit of SigBmp from a first value to a second value. The framework 310 of the electronic device 300 may read the remote control message (e.g. RkeMsg) from the mailbox by referring to a value configured in SigBmp. After reading the remote control message, the framework 310 may delete the remote control message from the mailbox and reset the bit of SigBmp to the first value.

The remote control message (e.g. RkeMsg) transferred within a remote key command (e.g. RK command) may be configured by the framework 310 for a remote key service and read by the target device 700. A remote key command field may include a set of messages regarding remote key entry/access for remote control of the target device 700. The remote control message (e.g. RkeMsg) may be present in the private mailbox until the remote control message is consumed and removed by the target device 700. A length of a data field may be defined to be MAILBOX_CONTENT_END_OFFSET-RKEMSG_DATA_OFFSET.

A constant below may be additionally defined for remaining parts of the disclosure.

RKEMSG_DATA_BIT=04h

Table 7 below shows private mailbox memory mapping including a remote key command field.

TABLE 7

| Field | Memory Offset | Description | S-Bit |
|---|---|---|---|
| SigBmp | SIGNALING_BITMAP_OFFSET | signaling bitmap | n/a |
| ImTokBmp | IMMOBILIZER_TOKEN_BITMAP_OFFSET | immobilizer token bitmap | Bit 0 |
| SlotIdent | SLOT_IDENTIFIERS_OFFSET | Vehicle assigned 2-byte values to manage immobilizer tokens and revocation | Bit 1 |
| CarPropDat | CAR_OEM_PROPRIETARY_DATA_OFFSET | vehicle OEM proprietary data structure | Bit 2 |
| KeyAtt | KEY_ATTESTATION_PACKAGE_OFFSET | cryptographic key attestation package | Bit 3 |
| RkeMsgData | RKEMSG_DATA_BIT | Remote key entry message | Bit 4 |
| MbxEnd | MAILBOX_CONTENT_END_OFFSET | offset of first byte of free memory after last data structure | n/a |

In Table 7, RKEMSG_DATA_BIT (or RKEMSG_DATA_OFFSET) is used to store a remote key message to be prepared by the target device 700 and may define a start point of a remote control message data structure. An offset value may be a value specified by a manufacturer of the electronic device 300 or target device 700.

The remote key entry/access allows a user to control the target device 700 via an interaction between the electronic device 300 and the user. For example, the remote key entry/access allows the user to use a remote control function, such as open or close a door of a vehicle, start an engine of the vehicle, or the like.

Figure 17:
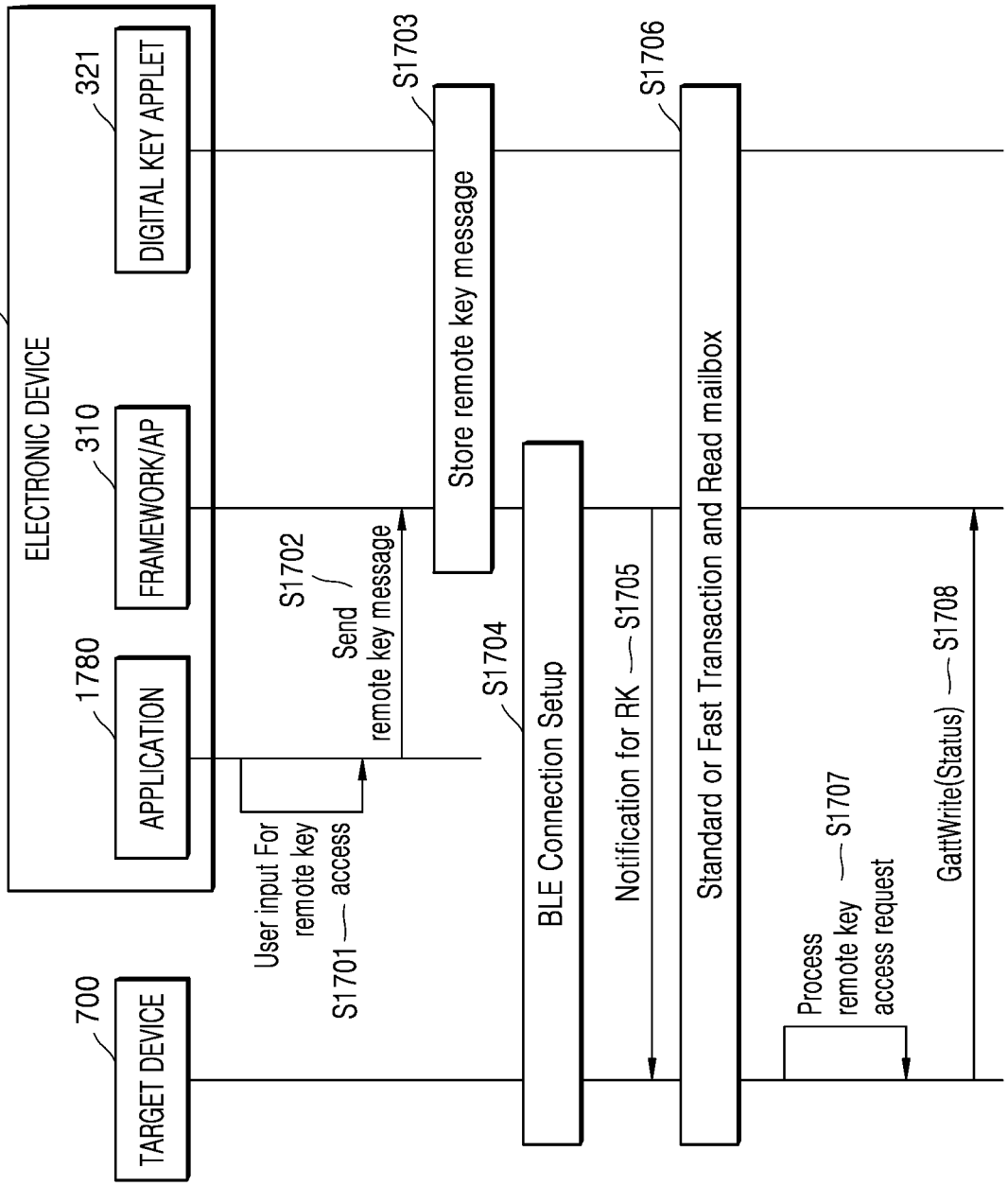
FIG. 17 illustrates another example of a method, performed by an electronic device, of transmitting a remote control command to a target device, according to an embodiment.

Regarding the remote key entry/access, the remote control message (e.g. RkeMsg) may be stored in the digital key applet 321 and read by the target device 700 after transaction. FIG. 17 illustrates operations for remote key access.

FIG. 17 illustrates another example of a method, performed by the electronic device 300, of transmitting the remote control command to the target device 700, according to an embodiment.

Referring to FIG. 17, in operation S1701, an application 1780 of the electronic device 300 may generate a remote control message (e.g., RkeMsg) based on a user input via a user interface. In operation S1702, the application 1780 may transmit the remote control message (e.g. RkeMsg) to the framework 310. Because a format of the remote control message (e.g. RkeMsg) varies depending on a manufacturer of the target device 700 (for example, a vehicle manufacturer), it may be difficult for the framework 310 and digital key applet 321 of the electronic device 300 to understand the remote control message. Upon receiving the remote control message, for example, from the application 1780, the framework 310 may store the remote control message (e.g. RkeMsg) in a private mailbox in the digital key applet 321, in operation S1703. The framework 310 may store the remote control message (e.g., RkeMsg) in the private mailbox in the digital key applet 321 and update the bit4 1601 of SigBmp to 1 as shown in FIG. 16.

When there is no BLE connection established between the electronic device 300 and the target device 700, BLE connection may be set up between the electronic device 300 and the target device 700 in operation S1704. When a pre-established BLE connection is present, operation S1704 may be omitted.

In operation S1705, the framework 310 may transmit, to the target device 700, a notification indicating that the remote control message (e.g., RkeMsg) is stored in the private mailbox. Upon receiving the notification, the target device 700 may perform a standard transaction or a fast transaction and read the private mailbox so as to recover the remote control message (e.g., RkeMsg) from the digital key applet 321, in operation S1706.

In operation S1707, the target device 700 may perform a corresponding operation based on a remote key entry/access request included in the remote control message (e.g., RkeMsg). In operation S1708, the target device 700 may update a status of the target device 700 by transmitting status information of the target device 700 to the electronic device 300.

Moreover, unlike the above embodiments of transmitting the remote control command RkeMsg after mutual authentication is performed, a method of transmitting the remote control command RkeMsg by using a transaction procedure, according to an embodiment, may be used.

The framework 310 of the electronic device 300 according to an embodiment may first transmit the remote control message (e.g., RkeMsg) to the target device 700. The target device 700 may request a digital key signature for the received remote control message (e.g., remote control command RkeMsg) and perform a remote control operation after verifying a signature result. This is described in detail below with reference to FIG. 18.

Figure 18:
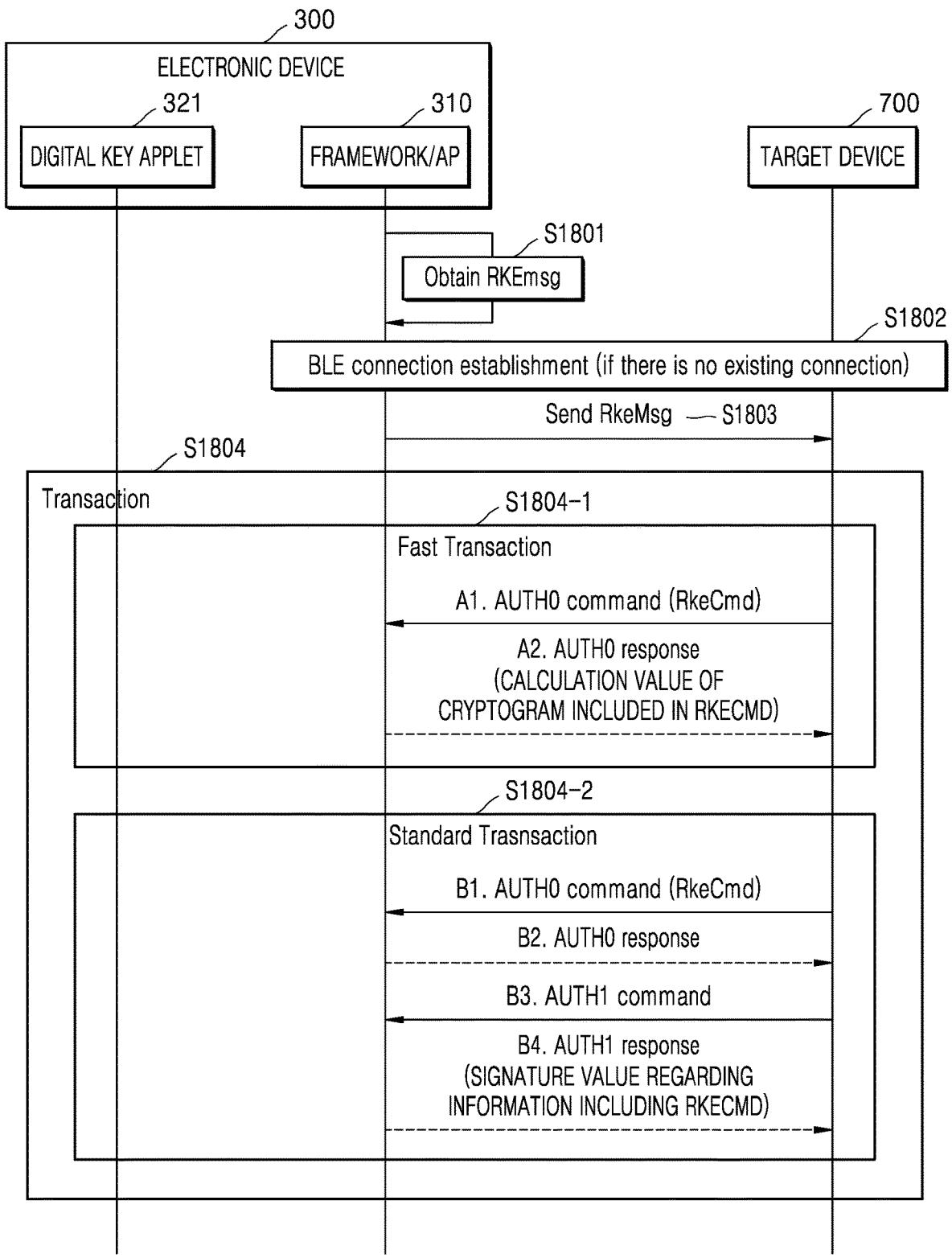
FIG. 18 illustrates another example of a method, performed by an electronic device, of transmitting a control command to a target device, according to an embodiment.

FIG. 18 illustrates another example of a method, performed by the electronic device 300, of transmitting a control command to the target device 700, according to an embodiment.

Referring to FIG. 18, in operation S1801, the framework 310 of the electronic device 300 may obtain a remote control message to which a user input is reflected. For example, the remote control message is a message generated by another application or generated directly by the framework 310.

In operation S1802, the framework 310 may establish a BLE connection with the target device 700. When a pre-established BLE connection is present, operation S1802 may be omitted.

In operation S1803, the framework 310 may transmit the remote control message obtained in operation S1801 to the target device 700.

In operation S1804, the electronic device 300 according to an embodiment may transmit a remote control command to the target device 700 and perform mutual authentication between the electronic device 300 and the target device 700 such that the target device 700 verifies the remote control command. During a mutual authentication process, the electronic device 300 may receive, from the target device 700, a command requesting a signature of the electronic device 300 regarding the remote control command, and transmit, to the target device 700, a response including a signature of the electronic device 300 regarding the remote control command.

In operation S1804, upon receiving the remote control message, the target device 700 may request the electronic device 300 for a signature regarding the received remote control message. For example, a signature request of the target device 700 may include the remote control message. Alternatively, the signature request may include a random value generated by the target device 700. Alternatively, the signature request may be performed as a part of the mutual authentication process.

When the target device 700 requests the electronic device 300 for a signature during transaction, the target device 700 may transmit, to the electronic device 300, information required for the signature together with the request.

Tables 8 through 10 below illustrate examples of a command available during the mutual authentication process, according to an embodiment of the disclosure.

In operation S1804-1, fast transaction may be performed between the electronic device 300 and the target device 700. In the fast transaction, the target device 700 may transmit a command of Table 8 below to the electronic device 300.

TABLE 8

| Tag | Length | Description | Field is |
|---|---|---|---|
| 5C$_h$ | 2 | protocol_version = 0100$_h$, the protocol version supported by reader, must be one of the versions proposed by endpoint in SELECT response | mandatory |
| 87$_h$ | 65 | 04$_h$\|\| reader_ePK | mandatory |
| 4C$_h$ | 16 | transaction_identifier | mandatory |
| 4D$_h$ | 8 | reader_identifier | mandatory |
| XXh | XX | Remote key command | conditional |

Table 8 illustrates information included in an AUTH0 command defined by the CCC standard. A remote key command field in Table 8 may be included in the AUTH0 command only when the remote control message is received from the electronic device 300.

The remote key command may store the received remote control message RkeMsg as it is or may store a value separately processed or calculated based on the received remote control message RkeMsg.

Upon receiving the AUTH0 command from the target device 700, the electronic device 300 may transmit an AUTH0 response. The AUTH0 response may include information as shown in Table 9 below.

TABLE 9

| Tag | Length | Description | Field is |
|---|---|---|---|
| 86$_h$ | 65 | endpoint_ePK, the applet generated ephemeral public key | mandatory |
| 9D$_h$ | 16 | cryptogram, the authentication cryptogram returned by the endpoint | conditional |

When (or based on) the remote key command field is included in the AUTH0 command as in Table 8, the digital key applet 321 may calculate a cryptogram by adding a remote key command. For example, context used for calculation of the cryptogram may be reader_PK.x\|\|endpoint_PK.x\|\|transaction_identifier\|\|reader identifier\|\|remote key command.

Moreover, in operation S1804-2, a standard transaction may be performed between the electronic device 300 and the target device 700. In the standard transaction, as in A1 of operation S1804-1, the target device 700 may transmit the command of Table 8 to the electronic device 300. Upon receiving the AUTH0 command from the target device 700, the electronic device 300 may transmit an AUTH0 response. The AUTH0 response may or may not include a cryptogram.

The target device 700 may transmit, to the digital key applet 321, an AUTH1 command including the signature of the target device 700. Here, the AUTH1 command defined in the CCC standard may be used.

The digital key applet 321 may respond to the AUTH1 command via an AUTH1 response including a signature value using a digital key. For example, the AUTH1 response may include a signature value regarding information of Table 10 below.

TABLE 10

| Tag | Length | Description | Field is |
|---|---|---|---|
| $4E_h$ | 1–8 | key_slot | mandatory |
| $9E_h$ | 64 | endpoint_sig | mandatory |
| $57_h$ | 4 | counter_value, this field contains the current endpoint counter value | conditional |
| $4A_h$ | variable | confidential_mailbox_data_subset | conditional |
| $4B_h$ | variable | private_mailbox_data_subset | conditional |
| XX | XX | Remote key command | conditional |

A remote key command field of Table 10 may be included only when a remote key command is included in the AUTH0 command.

As described above, according to various embodiments, the remote control command may be safely transmitted from the electronic device 300 to the target device 700. Hereinafter, a detailed configuration of the electronic device 300 is described.

Figure 19:
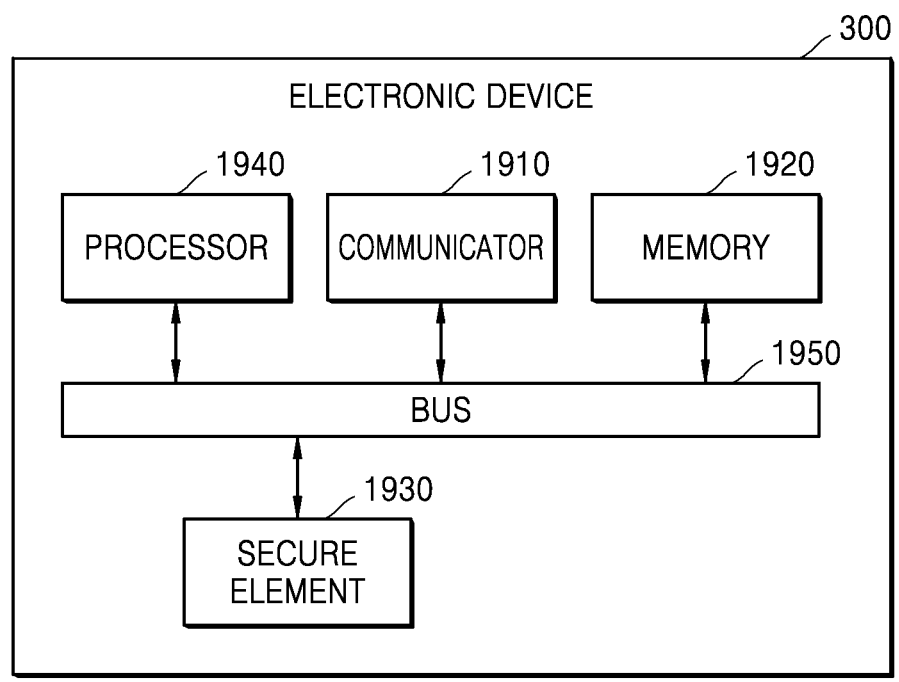
FIG. 19 is a block diagram of an electronic device according to an embodiment.

FIG. 19 is a block diagram of an electronic device 300 according to an embodiment.

The electronic device 300 according to an embodiment may include a personalized mobile device, but is not limited thereto and may include various types of electronic devices. For example, the electronic device 300 may include a smart phone, a tablet PC, a camera, a wearable device, etc.

Referring to FIG. 19, the electronic device 300 may include a communicator 1910, a memory 1920, a secure element 1930, a processor 1940, and a bus 1950 connecting each component. It is understood, however, that the electronic device 300 may include more, fewer, and/or different components than those shown in FIG. 19.

In FIG. 19, the electronic device 300 includes one processor, but an embodiment of the disclosure is not limited thereto and the electronic device 300 may include a plurality of processors. Hereinafter, at least some of operations and functions of the processor 1940 described below may be performed by a plurality of processors.

The electronic device 300 of FIG. 19 may perform an operating method of the electronic device 300, according to various embodiments, and any of the descriptions of FIGS. 1 through 3, 4A, 4B, and 5 through 18 may be applied thereto. Thus, redundant descriptions thereof may not be repeated below.

The communicator 1910 according to an embodiment may perform wired/wireless communication with another device or network. In this regard, the communicator 1910 may include a communication module supporting at least one of various wired/wireless communication methods. For example, the communication module may be in a form of a chipset or may be a sticker/barcode (for example, a sticker including a near field communication (NFC) tag) including information for (e.g., required for) communication.

According to an embodiment, the communicator 1910 may include a communication module for short range communication. For example, the communicator 1910 may include a communication module for performing various short range communications, such as infrared communication, magnetic secure transmission (MST), and magnetic secure communication, in addition to Wi-Fi, Wi-Fi direct, Bluetooth, BLE, and NFC described above.

A program such as an application and various types of data such as a file may be installed and stored in the memory 1920. The processor 1940 may access and use the data stored in the memory 1920 or may store new data in the memory 1920. According to an embodiment, a program (for example, a framework) and data for management of a digital key may be installed and stored in the memory 1920.

For example, the memory 1920 may include at least one type of storage medium among a flash memory type, a hard disk type, a multimedia card micro type, a card type memory (for example, a secure digital (SD) or an extreme digital (XD) memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

The electronic device 300 according to an embodiment includes the secure element 1930, and the secure element 1930 may perform processes of generating, deleting, and managing a digital key for controlling or accessing an external device and may perform authentication on the digital key. In addition, the secure element 1930 may authenticate an access of an external entity, such as a service provider server, to the digital key and provide a function of safely managing the digital key by verifying authority.

The secure element 1930 is an independent secure storage device of the electronic device 300, and is a secure region to which only an authenticated application is accessible. The secure element 1930 may be configured to be physically isolated from another hardware configuration. According to an embodiment, a program and data (for example, a secure domain, an applet, or the like) for management of the digital key may be installed and stored in the secure element 1930.

The processor 1940 may control overall operations of the electronic device 300 and include at least one processor, such as a central processing unit (CPU) or a graphics processing unit (GPU). The processor 1940 may control other components included in the electronic device 300 to perform an operation for managing the digital key. For example, the processor 1940 may execute a program stored in the memory 1920 and the secure element 1930, read a file stored in the memory 1920 and the secure element 1930, or store a new file in the memory 1920 and the secure element 1930.

According to an embodiment, the processor 1940 may receive a request to process the digital key from an external device or application by using the framework, and transmit the request and authentication information stored in the framework to a secure domain and/or instance of the secure element 1930. The processor 1940 may process the digital key based on the request to process the digital key, the authentication information received from the framework, and the authentication information stored in the secure element 1930, by using the applet executed in the secure element 1930. Here, the processing of the digital key may include at least one operation from among generating, deleting, and managing of the digital key.

The bus 1950 is a common data transmission path connecting the communicator 1910, the memory 1920, the secure element 1930, and the processor 1940.

The processor 1940 according to an embodiment may obtain information related to encryption, based on a mutual authentication process between the electronic device 300 and the target device 700. The processor 1940 may transmit the information related to encryption from a digital key applet to the framework and encrypt a remote control command by using the information related to encryption. The processor 1940 may transmit the encrypted remote control command to the target device 700 via the communicator 1910.

For example, to perform mutual authentication between the electronic device 300 and the target device 700, the processor 1940 may receive an ephemeral public key of the target device 700 from the target device 700 and transmit an ephemeral public key of the electronic device 300 to the target device 700. The processor 1940 may receive, from the target device 700, first data in which information including the ephemeral public key of the target device 700 and the ephemeral public key of the electronic device 300 is signed with a secret key of the target device 700. The processor 1940 may verify the first data by using a public key of the target device 700. The processor 1940 may transmit, to the target device 700, second data in which the information including the ephemeral public key of the target device 700 and the ephemeral public key of the electronic device 300 is signed with a secret key of the electronic device 300. The processor 1940 may obtain an encryption key Krke as the information related to encryption by using the ephemeral public key of the target device 700 and an ephemeral secret key of the electronic device 300.

The processor 1940 may encrypt the remote control command received from the digital key applet by using the encryption key Krke. The processor 1940 may transmit the encrypted remote control command to the target device 700.

As another example, the processor 1940 may generate a symmetric long-term key based on a key exchange process with the target device 700. Then, the processor 1940 may obtain a nonce generated during the mutual authentication process. The processor 1940 may obtain the encryption key Krke as the information related to encryption by using the nonce and the symmetric long-term key. The processor 1940 may encrypt the remote control command by using the encryption key Krke.

As another example, the processor 1940 may perform mutual authentication with the target device 700 and receive a request to generate the encryption key Krke from the target device 700. The processor 1940 may generate the encryption key Krke by using the ephemeral public key of the target device 700 received during the mutual authentication process, based on the request to generate the encryption key Krke on the digital key applet.

The processor 1940 may receive, from the target device 700, a request to generate a session key including the nonce. The digital key applet may obtain the session key by using the nonce and the encryption key Krke, based on the request to generate the session key, and transmit the session key to the framework.

As another example, the processor 1940 may obtain the remote control command to which a user input is reflected and transmit the remote control command to the target device 700. The processor 1940 may perform mutual authentication between the electronic device 300 and the target device 700 such that the target device 700 verifies the remote control command. To perform the mutual authentication, the processor 1940 may receive, from the target device 700, a command requesting a signature of the electronic device 300 regarding the remote control command, and transmit, to the target device 700, a response including a signature of the electronic device 300 regarding the remote control command.

Figure 20:
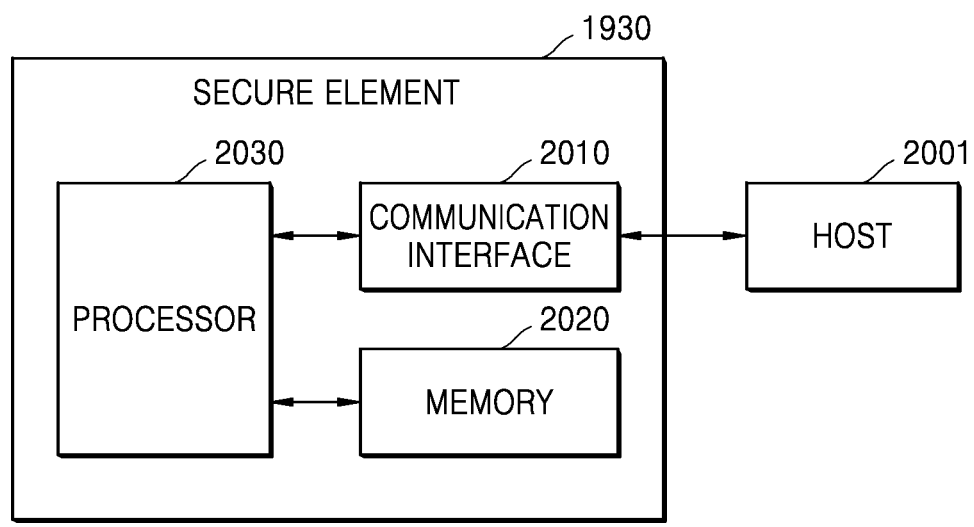
FIG. 20 is a block diagram of a secure element according to an embodiment.

FIG. 20 is a block diagram of a secure element 1930 according to an embodiment.

The secure element 1930 of FIG. 20 may correspond to the secure element 1930 of FIG. 19 described above.

Referring to FIG. 20, the secure element 1930 may include a communication interface 2010, a memory 2020, and a processor 2030.

The secure element 1930 according to an embodiment is an independent secure storage device of the electronic device 300, and is a secure region to which only an authenticated application is accessible. For example, the secure element 1930 may include an embedded secure element (eSE), a universal integrated circuit card (UICC), a secure digital (SD) card, or an embedded UICC (eUICC).

The communication interface 2010 may communicate with a host 2001. According to an embodiment, the communication interface 2010 may include at least one of various wired/wireless communication interfaces for communicating with the host 2001. Here, the host 2001 may be one of devices included in the electronic device 300 and, for example, may include at least one of an application processor (AP), the framework 310, the TEE 311, and a memory. The communication interface 2010 may be, for example, a serial interface such as ISO 7816, universal serial bus (USB), an inter-integrated circuit (I2C), a serial peripheral interface (SPI), or a single wire protocol (SWP), or any serial interface generally used for communication between two hardware devices. Alternatively, the communication interface 2010 may be a wireless interface, such as ISO 14443, Zigbee, Bluetooth, or BLE, which directly connects an antenna to a hardware device. In addition, the communication interface 2010 may be a parallel interface connected to a central bus of the electronic device 300, and in this case, the communication interface 2010 may include a buffer for receiving a command and data from the host 2001.

A program such as an applet and various types of data such as a file may be installed and stored in the memory 2020. The processor 2030 may access and use the data stored in the memory 2020 or may store new data in the memory 2020. According to an embodiment, a program and data for processing of a digital key may be installed and stored in the memory 2020. The memory 2020 may be a non-volatile storage device.

The processor 2030 may control overall operations of the secure element 1930 and include at least one processor, such as a CPU or a GPU. The processor 2030 may control other components included in the secure element 1930 to perform an operation for processing the digital key. For example, the processor 2030 may execute a program stored in the memory 2020, read a file stored in the memory 2020, or store a new file in the memory 2020. According to an embodiment, the processor 2030 may execute a program stored in the memory 2020 to perform an operation for processing the digital key.

A light-weight application (or applet) may be installed and driven in the secure element 1930 according to an embodiment. The applet may store the digital key inside the secure element 1930 and provide a service of using, deleting, and managing the stored digital key. Such an applet may be pre-installed in the secure element 1930 or may be loaded or installed later when necessary.

Figure 21:
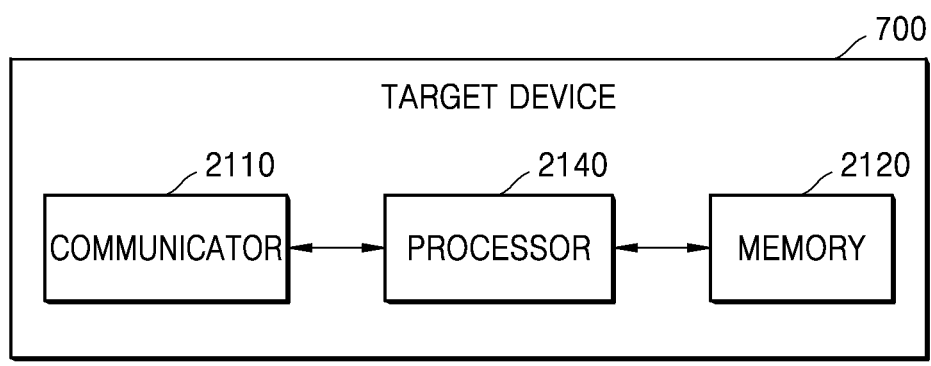
FIG. 21 is a block diagram of a target device according to an embodiment.

FIG. 21 is a block diagram of the target device 700 according to an embodiment.

The target device 700 according to an embodiment may include an electronic device that is mounted on a vehicle, is connected to a vehicle, is included in a vehicle, or controls a vehicle. The target device 700 may include a vehicle console, a vehicle key system, a terminal mounted on a vehicle, a vehicle telematics system or a vehicle electric device or a vehicle electric device system. For example, the target device 700 may control not only opening and closing of a door, a trunk, and a gas tank of a vehicle, but also an engine and an air conditioner.

It is understood, however, that the target device 700 according to an embodiment is not limited thereto, and may include various types of electronic devices. For example, the target device 700 may include a smart TV, a set-top box, a mobile phone, a tablet PC, a digital camera, a laptop computer, a desktop computer, an electronic book terminal, a digital broadcasting terminal, a PDA, a PMP, a navigation device, an MP3 player, a wearable device, and any device capable of communicating with a server via a network and capable of communicating with the electronic device 300 via short distance wireless communication.

Referring to the FIG. 21, a target device 700 may include a communicator 2110, a memory 2120, and a processor 2140. However, the target device 700 may include more, fewer, and/or different components than those shown in FIG. 21.

In FIG. 21, the target device 700 includes one processor, but an embodiment is not limited thereto and the target device 700 may include a plurality of processors. Hereinafter, at least some of operations and functions of the processor 2140 described below may be performed by a plurality of processors.

The target device 700 of FIG. 21 may perform an operating method of the target device 700, according to various embodiments, and any of the descriptions of FIGS. 1 through 3, 4A, 4B, and 5 through 18 may be applied thereto. Thus, redundant descriptions thereof may not be repeated below.

The communicator 2110 according to an embodiment may perform wired/wireless communication with another device or network. In this regard, the communicator 2110 may include a communication module supporting at least one of various wired/wireless communication methods. For example, the communication module may be in a form of a chipset or may be a sticker/barcode (for example, a sticker including an NFC tag) including information for communication.

According to an embodiment, the communicator 2110 may include a communication module for short range communication. For example, the communicator 2110 may include a communication module for performing various short range communications, such as infrared communication, MST, and magnetic secure communication, in addition to Wi-Fi, Wi-Fi direct, Bluetooth, BLE, and NFC described above.

A program such as an application and various types of data such as a file may be installed and stored in the memory 2120. The processor 2140 may access and use the data stored in the memory 2120 or may store new data in the memory 2120. According to an embodiment, a program (for example, a framework) and data for management of a digital key may be installed and stored in the memory 2120.

For example, the memory 2120 may include at least one type of storage medium among a flash memory type, a hard disk type, a multimedia card micro type, a card type memory (for example, a SD or XD memory), RAM, SRAM, ROM, EEPROM, PROM, a magnetic memory, a magnetic disk, and an optical disk.

According to an embodiment, the processor 2140 may receive a request to process the digital key from an external device or application, and transmit the request and authentication information stored in the framework to a secure domain and/or instance of a secure element. The processor 2140 may process the digital key based on the request to process the digital key, the authentication information received from the framework, and the authentication information stored in the secure element, by using the applet executed in the secure element. Here, the processing of the digital key may include at least one operation from among generating, deleting, and managing of the digital key.

The processor 2140 according to an embodiment may perform mutual authentication with the electronic device 300. The processor 2140 of the target device 700 according to an embodiment may obtain information related to encryption based on a mutual authentication process with the electronic device 300. The processor 2140 may receive an encrypted remote control command from the electronic device 300. The processor 2140 may decrypt the encrypted remote control command and perform a certain operation corresponding to the remote control command. The processor 2140 may obtain an encryption key or a session key from the information related to encryption obtained during the mutual authentication process with the electronic device 300, and decrypt the encrypted remote control command by using the encryption key or session key.

Also, the processor 2140 may transmit, to the electronic device 300, a result of performing the certain operation corresponding to the remote control command and update status information of the target device 700.

Embodiments may be implemented as a software program that includes instructions stored on computer-readable storage media.

A computer is an apparatus capable of calling a stored instruction from a storage medium and operating according to an embodiment based on the called instruction, and may include an electronic device and a target device according to embodiments of the disclosure.

A computer-readable storage medium may be provided in the form of a non-transitory storage medium. The term "non-transitory" only means that a storage medium does not include a signal and is tangible, and does not distinguish whether data is stored in the storage medium semi-permanently or temporarily.

Furthermore, an electronic device and method according to embodiments may be provided by being included in a computer program product. The computer program products are products that can be traded between sellers and buyers.

The computer program product may include a software program or a computer-readable storage medium storing a software program. For example, the computer program product may include a product (for example, a downloadable application) in a form of a software program that is electronically distributable through a manufacturer of the electronic device or an electronic market (for example, GOOGLE PLAYSTORE™ or APPSTORE™). For electronic distribution, at least a part of the software program may be stored in the storage medium or temporarily generated. In this case, the storage medium may be a storage medium of a server of a manufacturer, a server of an electronic market, or a relay server that temporarily stores the software program.

The computer program product may include a storage medium of a server or a storage medium of a terminal in a system including a server and a terminal, e.g., an electronic device using a digital key or a target device. Alternatively, when there is a third device, e.g., a smartphone, that communicates with a server or a terminal, the computer program product may include a storage medium of the third device. Alternatively, the computer program product may include the software program transmitted from the server to the terminal or the third device, or transmitted from the third device to the terminal.

In this case, one of the server, the terminal, and the third device may perform a method according to embodiments by executing the computer program product. Alternatively, two or more of the server, the terminal, and the third device may execute the computer program product to perform the method according to the embodiments of the disclosure in a distributed fashion.

For example, a server, such as a cloud server or an artificial intelligence server, may execute the computer program product stored in the server to control the terminal communicatively connected to the server to perform the method according to embodiments.

In another example, the third device may execute the computer program product to control the terminal communicatively connected to the third device to perform the method according to an embodiment. In a detailed example, the third device may remotely control the electronic device or the target device to manage a digital key or exchange a remote control message.

When the third device executes the computer program product, the third device may download the computer program product from the server and execute the downloaded computer program product. Alternatively, the third device may execute a computer program product provided in a preloaded state to perform a method according to embodiments.

While embodiments have been particularly shown and described in detail, it will be understood by one of ordinary skill in the art that various changes in form and details may be made therein without departing from the spirit and scope of the disclosure as defined at least by the following claims.

What is claimed is:

1. A method, of protecting and transmitting a plurality of remote control commands to a target device, the method comprising:
    performing a mutual authentication process between an electronic device and the target device;
    obtaining a parameter indicating whether a transaction performed for the mutual authentication process is an initial transaction after bluetooth low energy (BLE) connection between the electronic device and the target device, the parameter being a bit included in a command received from the target device during the mutual authentication process;
    in response to the parameter indicating that the transaction performed for the mutual authentication process is the initial transaction after the BLE connection, obtaining, by a digital key applet installed on a secure element of the electronic device, key information related to encryption of the plurality of remote control commands to control the target device, based on the parameter;
    providing, from the digital key applet and to a framework of the electronic device, the key information related to encryption of the plurality of remote control commands to control the target device;
    obtaining the plurality of remote control commands to control the target device, after the initial transaction;
    encrypting, by the framework, each of the plurality of remote control commands obtained to control the target device after the initial transaction, by using the key information related to encryption provided from the digital key applet; and
    transmitting, by the framework, each of the plurality of the encrypted remote control commands to the target device.

2. The method of claim 1,
    wherein the performing the mutual authentication process further comprises:
    receiving, from the target device, an ephemeral public key of the target device;
    transmitting, to the target device, an ephemeral public key of the electronic device;
    receiving, from the target device, first data in which information including the ephemeral public key of the target device and the ephemeral public key of the electronic device is signed with a secret key or a private key of the target device;
    verifying the first data by using a public key of the target device; and
    transmitting, to the target device, second data in which the information including the ephemeral public key of the target device and the ephemeral public key of the electronic device is signed with a secret key or a private key of the electronic device.

3. The method of claim 2, wherein the obtaining the key information related to encryption comprises obtaining an encryption key by using the ephemeral public key of the target device and an ephemeral secret key of the electronic device.

4. The method of claim 1, wherein the obtaining the key information related to encryption comprises:
    receiving, from the target device, a generation request for an encryption key; and
    obtaining the encryption key based on the generation request.

5. The method of claim 1, wherein the obtaining the key information related to encryption comprises:
    obtaining an encryption key based on the obtained parameter.

6. The method of claim 1, wherein the obtaining the key information related to encryption comprises:
    obtaining an encryption key from the target device by using a secure channel generated via the mutual authentication process.

7. The method of claim 1, wherein the providing the key information related to encryption comprises providing the key information related to encryption from the digital key applet to a trusted execution environment (TEE) in the framework; and
    the encrypting each of the plurality of remote control commands comprises encrypting each of the plurality of remote control commands by using the key information related to encryption in the TEE.

8. The method of claim 1, further comprising the obtaining each of the plurality of remote control commands generated by the framework or another application, based on a user input.

9. The method of claim 1, further comprising receiving information related to a status of the target device from the target device that performed an operation corresponding to an encrypted remote control command.

10. The method of claim 1, further comprising:
generating a symmetric long-term key based on a key exchange process between the electronic device and the target device,
wherein the obtaining the key information related to encryption comprises obtaining a nonce generated during the mutual authentication process, and obtaining an encryption key by using the nonce and the symmetric long-term key, and
wherein the encrypting each of the plurality of remote control commands comprises encrypting each of the plurality of remote control commands by using the encryption key.

11. The method of claim 1, wherein the obtaining the key information related to encryption comprises:
receiving, from the target device, a generation request for an encryption key;
generating, by the digital key applet, the encryption key by using an ephemeral public key of the target device received during the mutual authentication process, based on the generation request for the encryption key;
receiving, from the target device, a generation request for a session key including a nonce; and
obtaining the session key by using the nonce and the encryption key, based on the generation request for the session key on the digital key applet, and
wherein the providing the key information related to encryption comprises transmitting the session key from the digital key applet to the framework.

12. An electronic device comprising:
a secure element in which a digital key applet managing a digital key is installed;
a communicator configured to communicate with a target device; and
at least one processor connected to the secure element and configured to execute program instructions stored in a memory to:
perform a mutual authentication process between the electronic device and the target device;
obtain a parameter indicating whether a transaction performed for the mutual authentication process is an initial transaction after bluetooth low energy (BLE) connection between the electronic device and the target device, the parameter being a bit included in a command received from the target device during the mutual authentication process;
in response to the parameter indicating that the transaction performed for the mutual authentication process is the initial transaction after the BLE connection, obtain, by a digital key applet installed on the secure element, key information related to encryption of a plurality of remote control commands to control the target device, based on the parameter;
provide, from the digital key applet to a framework of the electronic device, the key information related to encryption of the plurality of remote control commands to control the target device;
obtain the plurality of remote control commands to control the target device, after the initial transaction;
encrypt, by the framework, each of the plurality of remote control commands obtained to control the target device after the initial transaction, by using the key information related to encryption provided from the digital key applet; and
transmit, by the framework, each of the plurality of the encrypted remote control commands to the target device.

13. The electronic device of claim 12, wherein the at least one processor is further configured to execute the program instructions to:
receive an ephemeral public key of the target device from the target device;
transmit, to the target device, an ephemeral public key of the electronic device;
receive, from the target device, first data in which information including the ephemeral public key of the target device and the ephemeral public key of the electronic device is signed with a secret key or a private key of the target device;
verify the first data by using a public key of the target device; and
transmit, to the target device, second data in which the information including the ephemeral public key of the target device and the ephemeral public key of the electronic device is signed with a secret key or a private key of the electronic device.

14. The electronic device of claim 12, wherein the at least one processor is further configured to execute the program instructions to:
generate a symmetric long-term key based on a key exchange process between the electronic device and the target device;
obtain a nonce generated during the mutual authentication process;
obtain an encryption key by using the nonce and the symmetric long-term key; and
encrypt each of the plurality of remote control commands by using the encryption key.

15. The electronic device of claim 12, wherein the at least one processor is further configured to execute the program instructions to:
receive, from the target device, a generation request for an encryption key and generate the encryption key by using an ephemeral public key of the target device received during the mutual authentication process, based on the generation request for the encryption key on the digital key applet;
receive, from the target device, a generation request for a session key including a nonce;
obtain the session key by the digital key applet using the nonce and the encryption key, based on the generation request for the session key; and
transmit the session key from the digital key applet to the framework.

16. The electronic device of claim 12, wherein the at least one processor is further configured to execute the program instructions to:
receive, from the target device via the communicator, a generation request for an encryption key; and
obtain the encryption key based on the generation request.

17. The electronic device of claim 12, wherein the at least one processor is further configured to execute the program instructions to:
obtain an encryption key based on the obtained parameter.

18. The electronic device of claim 12, wherein the at least one processor is further configured to execute the program instructions to:
obtain an encryption key from the target device by using a secure channel generated via the mutual authentication process.

* * * * *